US008046797B2

(12) United States Patent
Bentolila et al.

(10) Patent No.: US 8,046,797 B2
(45) Date of Patent: Oct. 25, 2011

(54) SYSTEM, METHOD, AND SOFTWARE APPLICATION FOR TARGETED ADVERTISING VIA BEHAVIORAL MODEL CLUSTERING, AND PREFERENCE PROGRAMMING BASED ON BEHAVIORAL MODEL CLUSTERS

(75) Inventors: Isaac Bentolila, San Francisco, CA (US); Yiming Zhou, Union City, CA (US); Labeeb K. Ismail, San Francisco, CA (US); Richard Humpleman, Fremont, CA (US)

(73) Assignee: Thomson Licensing, Boulogne-Billacourt (FR)

( * ) Notice: Subject to any disclaimer, the term of this patent is extended or adjusted under 35 U.S.C. 154(b) by 1174 days.

(21) Appl. No.: 10/043,714

(22) Filed: Jan. 9, 2002
(Under 37 CFR 1.47)

(65) Prior Publication Data
US 2003/0101451 A1 May 29, 2003

Related U.S. Application Data

(60) Provisional application No. 60/260,745, filed on Jan. 9, 2001.

(51) Int. Cl.
*G06F 3/00* (2006.01)
*H04N 7/10* (2006.01)
*H04N 7/025* (2006.01)
*G06Q 30/00* (2006.01)
*G06F 12/00* (2006.01)

(52) U.S. Cl. .......... 725/46; 725/34; 725/35; 705/14.49; 705/14.52; 705/14.53; 705/14.66; 705/14.67; 707/899

(58) Field of Classification Search ............. 725/35, 725/36, 45, 46, 34; 705/14.49, 14.52, 14.53, 705/14.66, 14.67; 707/899
See application file for complete search history.

(56) References Cited

U.S. PATENT DOCUMENTS 5,355,161 A * 10/1994 Bird et al. ................... 725/22
5,371,551 A 12/1994 Logan et al.
(Continued)

FOREIGN PATENT DOCUMENTS
EP 0 705 036 A2 4/1996
(Continued)

OTHER PUBLICATIONS

Lawrence R. Rabiner, "A tutorial on Hidden Markov Models and Selected Applications in Speech Recognition", IEEE Feb. 1989.*

(Continued)

*Primary Examiner* — Hoang-Vu A Nguyen-Ba
(74) *Attorney, Agent, or Firm* — Robert D. Shedd; Vincent E. Duffy; Joel M. Fogelson

(57) ABSTRACT

The method and system for TV user profile data prediction and modeling allows accurate and narrowly focused behavioral clustering. A client-side system classifies television consumers into representative user profiles. The profiles target individual user advertising and program preference category groups. A contextual behavioral profiling system determines the user's monitor behavior and content preferences, and the system may be continually updated with user information. A behavioral model database is queried by various system modules. The programming, including targeted advertising for television and interactive television is based on the profile data prediction, modeling and preference determination. The system is enabled to present a complete program sequence to the viewer based on the preference determination and stored programming. The latter is referred to as automatic program sequence (virtual channel) creation and the virtual channel can be presented as a separate channel in an electronic programming guide (EPG).

31 Claims, 15 Drawing Sheets

U.S. PATENT DOCUMENTS

| | | | |
|---|---|---|---|
| 5,446,919 A | 8/1995 | Wilkins | |
| 5,483,278 A | 1/1996 | Strubbe et al. | |
| 5,559,549 A | 9/1996 | Hendricks | |
| 5,565,909 A | 10/1996 | Thibadeau | |
| 5,600,364 A | 2/1997 | Hendricks et al. | |
| 5,635,989 A | 6/1997 | Rothmuller | |
| 5,636,346 A | 6/1997 | Saxe | |
| 5,664,046 A | 9/1997 | Abecassis | |
| 5,699,473 A | 12/1997 | Kim | |
| 5,701,383 A | 12/1997 | Russo et al. | |
| 5,704,017 A | 12/1997 | Heckerman et al. | |
| 5,717,923 A | 2/1998 | Dedrick | |
| 5,724,521 A * | 3/1998 | Dedrick | 705/26 |
| 5,754,651 A | 5/1998 | Blatter et al. | |
| 5,758,257 A | 5/1998 | Herz et al. | |
| 5,758,259 A | 5/1998 | Lawler | |
| 5,761,371 A | 6/1998 | Ohno et al. | |
| 5,774,170 A | 6/1998 | Hite | |
| 5,798,785 A * | 8/1998 | Hendricks et al. | 725/46 |
| 5,801,747 A * | 9/1998 | Bedard | 725/46 |
| 5,835,087 A | 11/1998 | Herz et al. | |
| 5,848,396 A | 12/1998 | Gerace | |
| 5,867,226 A | 2/1999 | Wehmeyer et al. | |
| 5,898,456 A | 4/1999 | Wahl | |
| 5,953,073 A | 9/1999 | Kozina et al. | |
| 5,977,964 A | 11/1999 | Williams et al. | |
| 5,990,927 A | 11/1999 | Hendricks et al. | |
| 6,002,393 A | 12/1999 | Hite | |
| 6,018,612 A | 1/2000 | Thomason et al. | |
| 6,020,883 A * | 2/2000 | Herz et al. | 715/721 |
| 6,029,045 A | 2/2000 | Picco et al. | |
| 6,088,722 A * | 7/2000 | Herz et al. | 709/217 |
| 6,091,883 A | 7/2000 | Artigalas et al. | |
| 6,157,772 A | 12/2000 | Kim | |
| 6,160,570 A | 12/2000 | Sitnik | |
| 6,169,842 B1 | 1/2001 | Pijnenburg et al. | |
| 6,177,931 B1 * | 1/2001 | Alexander et al. | 725/52 |
| 6,233,389 B1 | 5/2001 | Barton et al. | |
| 6,304,714 B1 | 10/2001 | Krause et al. | |
| 6,324,338 B1 | 11/2001 | Wood et al. | |
| 6,446,261 B1 * | 9/2002 | Rosser | 725/34 |
| 6,457,010 B1 | 9/2002 | Eldering et al. | |
| 6,463,585 B1 * | 10/2002 | Hendricks et al. | 725/35 |
| 6,601,237 B1 | 7/2003 | Ten Kate et al. | |
| 6,637,029 B1 | 10/2003 | Maissel et al. | |
| 6,681,396 B1 | 1/2004 | Bates et al. | |
| 6,698,020 B1 | 2/2004 | Zigmond et al. | |
| 6,704,930 B1 | 3/2004 | Eldering et al. | |
| 6,738,978 B1 * | 5/2004 | Hendricks et al. | 725/35 |
| 6,799,326 B2 | 9/2004 | Boylan, III et al. | |
| 6,898,762 B2 | 5/2005 | Ellis et al. | |
| 6,918,131 B1 * | 7/2005 | Rautila et al. | 725/34 |
| 6,950,623 B2 | 9/2005 | Brown et al. | |
| 6,981,040 B1 | 12/2005 | Konig et al. | |
| 7,003,792 B1 * | 2/2006 | Yuen | 725/46 |
| 7,035,528 B1 | 4/2006 | Britton | |
| 7,051,351 B2 | 5/2006 | Goldman et al. | |
| 7,051,352 B1 | 5/2006 | Schaffer | |
| 2001/0004733 A1 | 6/2001 | Eldering | |
| 2002/0057893 A1 | 5/2002 | Wood et al. | |
| 2002/0118954 A1 | 8/2002 | Barton et al. | |
| 2002/0199194 A1 | 12/2002 | Ali | |
| 2003/0040962 A1 | 2/2003 | Lewis | |
| 2003/0088872 A1 | 5/2003 | Maissel et al. | |
| 2003/0093792 A1 | 5/2003 | Labeeb et al. | |
| 2003/0145323 A1 | 7/2003 | Hendricks et al. | |
| 2004/0111742 A1 | 6/2004 | Hendricks et al. | |
| 2004/0117831 A1 | 6/2004 | Ellis et al. | |
| 2005/0047752 A1 | 3/2005 | Wood et al. | |
| 2005/0193410 A1 * | 9/2005 | Eldering | 725/34 |
| 2005/0235318 A1 | 10/2005 | Grauch et al. | |
| 2008/0040749 A1 * | 2/2008 | Hoffberg et al. | 725/46 |

FOREIGN PATENT DOCUMENTS

| | | | |
|---|---|---|---|
| EP | 0 774 866 A2 | | 5/1997 |
| EP | 0 823 815 A2 | | 2/1998 |
| EP | 0 838 951 A2 | | 4/1998 |
| EP | 0 854 645 A2 | | 7/1998 |
| EP | 0 909 095 A1 | | 4/1999 |
| EP | 1 045 582 A | | 4/2000 |
| WO | 94/13107 A1 | | 6/1994 |
| WO | 95/01057 A1 | | 1/1995 |
| WO | 96/31980 A1 | | 10/1996 |
| WO | WO 97/41673 A2 | | 11/1997 |
| WO | 97/48230 A1 | | 12/1997 |
| WO | 98/28906 A2 | | 7/1998 |
| WO | WO 99/01984 A1 | | 1/1999 |
| WO | WO 00/02380 | | 1/2000 |
| WO | WO 00/04708 A1 | | 1/2000 |
| WO | WO 00/11869 | | 3/2000 |
| WO | WO00-33160 | * | 6/2000 |
| WO | WO 00/33160 | | 6/2000 |

OTHER PUBLICATIONS

Office Action issued in Japanese Patent Application No. 002179/2002, Jan. 15, 2008 (English translation enclosed).

U.S. Office Action for U.S. Appl. No. 09/953,327 mailed Jul. 20, 2009.

U.S. Office Action for U.S. Appl. No. 09/953,327 mailed Nov. 12, 2008.

U.S. Office Action for U.S. Appl. No. 09/953,327 mailed May 29, 2008.

U.S. Office Action for U.S. Appl. No. 09/953,327 mailed Sep. 11, 2007.

U.S. Office Action for U.S. Appl. No. 09/953,327 mailed Sep. 14, 2005.

U.S. Non-Final Office Action for U.S. Appl. No. 09/893,192 mailed Jun. 15, 2005.

U.S. Final Office Action for U.S. Appl. No. 09/893,192 mailed Aug. 2, 2007.

U.S. Non-Final Office Action for U.S. Appl. No. 09/893,192 mailed Mar. 7, 2008.

U.S. Final Office Action for U.S. Appl. No. 09/893,192 mailed Mar. 17, 2009.

U.S. Non-Final Office Action for U.S. Appl. No. 09/893,192 mailed Oct. 6, 2009.

Oracle Lite, The Client Database for Java; by Oracle Lite, Jun. 5, 1998.

API Requirements for the Advanced Set-Top Box, by Open-Cable, Jun. 5, 1998.

The Challenges of Convergence for Set-Top Box Manufacturers; IBM Microelectronics, Jun. 5, 1998.

White Paper, Set-Top Box Solutions: Helping Customers Meet the Challenge of Convergence; IBM Microelectronics, Jun. 5, 1998.

Set-Top Box Peripheral Chip; IBM Microelectronics, Jun. 5, 1998.

Set-Top Box Reference Design Kit; IBM Microelectronics, Jun. 5, 1998.

Set-Top Box Solutions; IBM Microelectronics, Jun. 5, 1998.

OpenTV Operating Environment, Technical White Paper, OpenTV, Inc., Jun. 8, 1998.

Application Development for OpenTV, Technical White Paper, OpenTV, Inc., Jun. 8, 1998.

Starsight: The Interactive On-Screen TV Program Guide Service With One-button VCR programming; Star-Sight Telecast, Inc., Jun. 9, 1998.

StarSight: An Introduction, StarSight Telecast, Inc., Jun. 9, 1998.

Services for On-Screen Guides; TVData, Jun. 9, 1998.

The Largest Databases of Television Information in the World, TVData, Jun. 9, 1998.

Kageyama et al., "A Free Time_Shift DVD Video Recorder"; Aug. 1997, IEEE, pp. 463-473.

U.S. Office Action for U.S. Appl. No. 09/953,327 mailed Mar. 15, 2006.

U.S. Advisory Action for U.S. Appl. No. 09/953,327 mailed Jun. 5, 2006.

U.S. Office Action for U.S. Appl. No. 09/953,327 mailed Aug. 16, 2006.

U.S. Final Office Action for U.S. Appl. No. 09/953,327 mailed Mar. 21, 2007.

* cited by examiner

SYSTEM, METHOD, AND SOFTWARE APPLICATION FOR TARGETED ADVERTISING VIA BEHAVIORAL MODEL CLUSTERING, AND PREFERENCE PROGRAMMING BASED ON BEHAVIORAL MODEL CLUSTERS

CROSS-REFERENCE TO RELATED APPLICATIONS

This application claims the benefit under 35 U.S.C. §119 (e) of provisional application No. 60/260,745, filed Jan. 9, 2001.

Further reference is made to the disclosures found in the commonly assigned, concurrently filed, copending patent application Ser. No. 10/043,698, application Ser. No. 09/893,192, describing a system and method for delivery of television programs and targeted de-coupling advertising; application Ser. No. 09/096,592, entitled "Television Program Recording with User Preference Determination"; and application Ser. No. 09/953,327, describing logic operators for delivery of targeted programming, and SQL query operators for targeting expressions. The disclosures of the copending applications are herewith incorporated by reference.

BACKGROUND OF THE INVENTION

1. Field of the Invention

The invention lies in the field of interactive television programming. Specifically, the invention pertains to a method and system for TV user profile data prediction and modeling, to a method and system for program and/or advertisement program preference determination, to a method and system for targeted advertising for television and interactive television based on the profile data prediction, modeling and preference determination, and to a method and system with which a complete program sequence can be presented to the viewer based on the preference determination and stored programming. The latter will be referred to as automatic program sequence (Virtual Channel) creation and the virtual channel will be presented as a separate channel in the electronic programming guide (EPG).

2. Description of the Prior Art

Systems and methods to target advertising in interactive television are known. The prior art systems and methods generally target advertising through a statistically sampled, program driven mechanism. Advertising for television is priced in accordance with the rating of a certain program and time slot. Advertisements must be placed so that they reach the intended target audience. The more audience a certain program delivers, and the more clearly focused that audience is with regard to the demographic information, the higher the price for placing the advertisement. By far the most popular TV ratings system currently in use in the United States is Nielsen Media Research. The Nielsen ratings and share system is based on a 5000 member national sample and approximately 50 local market samples. The information gleaned from the national sample is based on a measurement of which program is watched at a certain time in a given television household and by which members of the household. The latter information is determined via so-called People Meters that are installed in the sample households and via which the viewers indicate when they are watching TV at a certain time by pushing a button individually assigned to them. The national sample utilizes rather crude demographic information to define preference ratings for the program determination. The results are published via ratings that are defined relative to the statistical universe (e.g., all television households, male 20 to 40 years, etc.) and by shares. The latter represent a percentage of the universe members watching a given program at the time of its broadcast. A slightly more accurate system, referred to as the Portable People Meter, is currently being tested in a limited local television market by Arbitron. The Portable People Meter is a pager-sized electronic transceiver that records a person's television usage via inaudible codes that are superimposed on television programs. At the end of the day, the transceiver is placed on a base station, from which the recorded information is then sent to a central data processing facility.

In the context of TV user profile data prediction and modeling, the prior art methods and systems do not use program arrival and departure frequency and click timing as preference indicators. Preference ratings in the context of programming predictions are thus rather rudimentary. Since prior art systems do not model transitions, sequential program behavior, and temporal program utilization in a general predictive architecture, they are unable to predict a user's preference based on sophisticated content and temporal relationships.

By not assessing when there is adequate evidence to infer a preference, known methods tend to incorrectly predict user preferences, or they may wait too long before building higher confidence. Known classification methods require that all feature dimensions of a sample be correlated to the observation, and then assume a Gaussian distribution parameterization to describe group clusters. However, this is inaccurate as the data are not generally subject to normal distribution.

In the context of program or advertising program preference determination, the prior art methods do not have an automatic user input, and thus no method of learning which metrics best predict a certain user's preference. Further, if preference ratings are available for a given demographic group, they are only stationarily weighted and no dynamic weighting adjustment is effected.

In the context of targeted advertising for television and interactive television, the prior art methods principally use demographic information, not contextual behavioral information as part of the user targeting profile. This reduces targeting performance in non-demographically classifiable consumer groups, and demographic inferring accuracy.

SUMMARY OF THE INVENTION

It is accordingly an object of the invention to provide a system and method for behavioral model clustering in TV usage and targeted advertising and preference programming, which overcomes the above-mentioned disadvantages of the heretofore-known devices and methods of this general type.

With the foregoing and other objects in view there is provided, in accordance with the invention, a television rating system for targeted program delivery, comprising:
a clustering engine receiving television viewing data input, processing the viewing data input, and generating user profiles targeting advertising category groups;
a client-side system adapted to classify a television user into at least one advertising category group;
a contextual behavioral profiling system connected to the client-side system and determining a television user's viewing behavior with content and usage-related preferences; and
a behavioral model database connected to the profiling system and storing therein information with the television user's viewing behavior.

In accordance with an added feature of the invention, the clustering engine is a software agent residing in a central computer system at a television distribution head-end and is programmed to create template behavioral profiles corresponding to targeted advertising categories of television viewers.

In accordance with an additional feature of the invention, the clustering engine is trained substantially exclusively on tagged viewing data from a given target group to learn a most general profile of the given target group.

In accordance with another feature of the invention, the clustering engine is programmed to generalize viewer's profiles in each group into a representative aggregation for a respective advertising category, and to form advertising category profiles by aggregating all dimensions most strongly in common for the given group and most unique across target groups.

In accordance with a further feature of the invention, there is provided an advertisement manager connected to query the behavioral model database. The advertisement manager is programmed to parameterize behavioral profiles of the behavioral model database and to download the parameterized behavioral profiles to an advertising category membership agent residing at the client-side system. Preferably, the advertising category membership agent is configured to reconstruct the downloaded parameterized targeting models, and apply a clustering engine to the television user's history to determine a most likely advertising category the user belongs to and store the results as targeting category probabilities in a user category database. Further, there may be provided targeting agents and presentation agents disposed at the client-side system for combining the targeting category probabilities and relevant preference information to selectively capture, store, and display advertisements downloaded in accordance with the optimization.

With the above and other objects in view, there is also provided, in accordance with the invention, a preference engine for use in an interactive display system with a head-end side distributing program content and a client side receiving the program content and selectively displaying the program content in accordance with a user's selection. The preference engine determines the user's preferred program content and includes:
a user monitoring device connected at the client side to record contextual transition behaviors profiling one or more users and to continually build a knowledgebase of preferences and contextual transition behaviors profiling the one or more users; and
a device for providing to the one or more users the program content in accordance with the user's demographic information and with the contextual transition behavior profile.

The user monitoring device of the preference engine models the user's behavioral interaction with advertising program content and with entertainment program content.

In accordance with again an added feature of the invention, the preference engine is connected to receive from the head-end metadata describing advertising content and metadata describing entertainment program content, and programmed to establish content preferences by combining metadata information with the contextual transition behavior profile, and to build a relational knowledge base with associations between the user's behavior, demographics, and program content preferences. The preference engine is programmed to model patterns of usage behaviors with a behavioral model and to extract key usage information from the behavioral model into a behavioral database, wherein each entry in the behavioral database has a confidence value associated therewith reflects an estimate of a structural and sampling quality of the data used to calculate the database entry.

With the above and other objects in view there is also provided, in accordance with the invention, a system for targeted program delivery in a program content delivery system having a head-end side and a client side. The targeting system comprises:
a central data system at the head-end side receiving viewing data selected from the group consisting of watch data, watch start time, watch duration, and watch channel, demographic information describing a program user, and an electronic program guide with metadata describing a program content;
a demographic cluster knowledge base acquirer receiving behavioral data of the user and outputting a knowledge base in form of a transition matrix with weight sets, the transition matrix predicting a demographic group of the user; and
a program content generating module providing to the client side streams of program content including advertisements based on the predicted demographic group of the user.

In accordance with again an added feature of the invention, there is provided a realtime feedback link for delivering to the central data system realtime information concerning a user's viewing behavior with click stream data.

In accordance with again an additional feature of the invention, the demographic cluster knowledge base acquirer is based on a hidden Markov model.

In accordance with again another feature of the invention, the demographic cluster knowledge base acquirer and the program content generating module are software modules each adapted to be stored on a machine-readable medium in the form of a plurality of processor-executable instructions.

In a preferred embodiment, the demographic cluster knowledge base acquirer generates demographic cluster information of the user in terms of statistical state machine transition models. The state machines are defined in the transition matrix, and the transition matrix contains information of program transitions initiated by the viewer.

Preferably, there are provided at least two concurrent transition matrices including a channel matrix and a genre matrix. Other matrices are possible as well, such as a title matrix, an actor matrix, and so on.

In accordance with again a further feature of the invention, the demographic cluster knowledge base acquirer is configured to parameterize the user's behavior with a double random pseudo hidden Markov process, and to define a low-level statistical state machine modeling a behavioral cluster and a top-level statistical state machine with active behavioral clusters and an interaction between the active behavioral clusters.

In accordance with a concomitant feature of the invention, the demographic cluster knowledge base acquirer is configured to define a double random process with a plurality of dimensions, and to determine parallel statistical state machine transition events in at least two of three state categories including channel, genre, and title of the program content.

The global profile represents demographic cluster information of the viewer in terms of the statistical state machine transition models. The invention provides for TV user profile data prediction and modeling: The resultant behavioral metrics tend to uniquely characterize individuals, and their preferences. The transition processes model user sequences and temporal transition preferences. The invention provides for a method to determine confidence in data quantity, and quality; for an algorithm to determine a distance between non-Gaussian, highly dimensional distributions; and a method to determine adequate separation between clusters for group membership classification.

The query interface according to the invention provide behavioral preference information to other system modules.

The novel program or Ad program preference determination uses:
  Weighted fuzzy voting preference metrics based on modeled usage context, content access timing, and content parameter sequencing.
  Frequency reinforced, non-linear preference metric vote weight learning architecture
  A vote aggregation algorithm that determines the top n content parameters (i.e., channels, genres, actors, titles, etc.) by adjusting for vote to vote quality and relative preference trends.

In a further conceptual group, targeted advertising for TV and interactive TV provides for:
  A training method to aggregate users in the target category
  A pruning technique to create the most representative user targeting category template and efficiently download it to the TV client system
  An efficient user targeting category membership determination scheme
  Automatic Virtual Channel program sequence creation using stored preferred programming and presented as a channel in the EPG.

Finally, there are provided algorithms to automatically place stored programs and Ads into a virtual channel's EPG (along side normal EPG entries) according to the user's preferred context (i.e., time, sequence, etc.).

The invention thus provides for a very accurate system of TV user profile data prediction and modeling. Prior art methods do not use program arrival and departure frequency and timings as preference indicators, thus they have less accurate preference ratings. Here, categories such as liked, unliked, and surfing conditions are modeled separately to better match a persons different behavioral meanings for each case. Prior art systems do not model transition, sequential, and temporal in a general predictive architecture. Thus, they are unable to predict a user's preference based on sophisticated content and temporal relationships. By not assessing when there is adequate evidence to infer a preference, known methods tend to incorrectly predict user preferences, or they may wait too long before building higher confidence.

Known classification methods require that all feature dimensions of a sample be correlated to the observation, and then assume a Gaussian distribution parameterization to describe group clusters. However, this is inaccurate as the data in not generally normally distributed. The present methods are able to determine clusters separation distances of multi-modal (non-bell shaped) distributions, and saves memory by not preserving each sample point in feature space. Furthermore, prior art methods do not make optimal cluster classification decisions when sample distributions are multi-modal. The system and method of the present invention make more appropriate group classifications as they work with any arbitrary distribution shape.

Based on the superior and multi-faceted behavior modeling, the invention allows for accurate program or ad program preference determination. By including rich temporal and sequential context information, the present system predicts a user's context dependent preferences. The invention utilizes automatic learning methods, i.e., explicit user input to best predict a certain user's preference. The present system dynamically adjusts preference prediction parameters to use a higher weighting for the most predictive features in rating a content parameter.

The present system influences preference ratings with sample-to-sample rating trends that prior art systems simply aggregate. By increasing (decreasing) a rating with better (lower) quality samples, a more accurate relative preference metric is achieved. By better modeling preference behavior, therefore, the invention enables far superior advertising and TV program targeting.

In the context of targeted advertising for TV and interactive TV, the prior art methods principally use demographic information, not contextual behavioral information as part of the user Ad targeting profile. Accordingly, targeting performance is reduced in non-demographically classifiable customer groups, and demographic inferring accuracy.

The present system reduces profile size by using a less conservative statistical significance metric, thus further reducing targeting template size, while preserving classification performance, by not downloading statistically erroneous profile information By inferring a TV user's targeting category membership as confidence derated distances from simple local templates, the present method achieves very accurate proportional membership likelihoods because, in contrast with the prior art, template profiles are not wrongly parameterized in statistical terms.

In addition to accurately classifying the viewers preferences for targeted advertising, the invention further enables the automatic creation of suggested program sequences. Here, we refer to a virtual channel program sequence creation using stored preferred programming. The suggested program sequences can be presented as a separate channel in the electronic programming guide (EPG). The virtual channel is superior to prior art systems in that the user experiences the virtual channel EPG with the same look and feel as any other channel, except the programs and showing times are placed as the user would more like it. The virtual channel provides a higher level of preferential programming that the simple listing of content that is available on the local storage. The novel system gives the TV user the feel of an 'on demand' channel.

In system and business model terms, the present invention is directed to a targeted advertising (Ad) system that provides:
  An innovative clustering mechanism to create and determine the most representative television (TV, refers to a Digital Television or Analog television and Set Top Box receiver combination, both with program storage) user profiles that best target individual user advertising category groups.
  A client-side system to classify a TV user into one, or more, advertising group categories.
  A contextual behavioral profiling system that determines a user's TV usage and content related preferences.
  A behavioral model database that is queried by other system modules for user preferences, supporting behaviorally targeted Ads, preferential virtual channel electronic programming guide (EPG) construction, preferential program storage, and automatic programming recommendations.

The novel Ad targeting system infers a TV user's advertising category without requiring the viewer to explicitly enter the information. An advertising category, herein, refers to a set of descriptive characteristics that groups a subset of users into categories that can be correlated to a targeting interest of advertisers. Traditionally, these categories have been based on demographic characteristics; however, the present invention expands user modeling, and targeting, to also include behavioral metrics. Thus, a much more robust, and refined Ad targeting system is possible. Apart from prior art, the present targeting system is not program data, but behavior data driven. The fundamental premise of this invention is that persons of a similar category will have certain behaviors that can be modeled and grouped with a significant degree of consistency. The primary underlying aspect of the invention is to develop an accurate model of the dynamic process, so that a clustering engine with a practical set of characteristic dimensions that can efficiently separate, or classify, the vast majority of viewers. In addition to automatically targeting advertising category members, the goal is to apply the behavioral modeling engine and database to determine a TV user's contextual preference for programming and Ads.

The present invention models TV program viewing as a double random pseudo Hidden Markov process, where there is a hidden, low level, statistical state machine (SSM) modeling a behavioral cluster, and an observable top level SSM that infers the active behavioral clusters and the interaction between them. The system is trained with tagged learning data (e.g., real-time TV click stream data tagged with the demographic identity of viewers) of a statistically representative, TV viewing population sample. The classification model is a hybrid combination of a parameterized random process, heuristics, and several single dimension behavioral metrics. A multiplicity of data quality measures determines the statistical significance of, and confidence in the training and test data.

The present invention includes an innovative sample size confidence measure. This metric estimates the bias in the random process that drive the SSM, by calculating the ratio of expected state transition coverage assuming state transitions were uniform randomly chosen, to the actual number of different state transitions observed. The ratio represents the state transition focus compared to random, and indicates the degree that there are enough samples to infer a non-uniform random process, specifically a viewer's personality, as meaningfully determining the SSM structure.

The double random process model has several dimensions to capture a wide variety of typical, but often unique, TV usage behaviors. In the preferred embodiment, each user's action, or selected non-actions, creates parallel SSM transition events in each of three state categories: Channel, Genre, and Title. These state categories are further subdivided into states of liked/unliked, and short_viewing/not-short_viewing characteristics. Inside of each categorical state machine described are chronological dimensions that model time sensitive state transitions. The temporal dimensions of the preferred embodiment models transition event chronology using a novel strategy that includes day_of_week, time_of_day, time_after_TV_turn_ON, and time_since_last_change. The TV user's program selection process, when observed through this time and transition sensitive model, detects complex usage patterns that tend to be unique to individuals, and more broadly to interesting classes of individuals. Behavioral sequences greater than one transition, such as channel surfing, and a multiplicity of heuristic distributions, such as session watch times, and psychometric parameters, such as genre curiosity, are used outside of the SSM as dimensions in a pseudo-Euclidean classification space.

A novel clustering method combines the SSM transition models (using transition matrix parameterization techniques) and non-Gaussian parameter distributions (by defining unique histogram distribution distance measures) to determine user separability through a dimension voting architecture. Each dimension votes two clusters as separate if the mean separation distance between most of the points is greater than their separation variance. Surpassing a certain threshold number of dimensional separation votes determines if the clusters are separate. The percentage of the dimensions that are voted as not separable between two clusters, approximates their amount of overlap.

In accordance with an added feature of the invention, the clustering engine (CE) software agent resides in a singular, computer system centrally located at the TV distribution head-end (called Admanager) and creates template behavioral profiles that correspond to targeted Adcategories of TV viewers. To learn the most general profile of a particular target group, the CE is trained on only tagged viewing data from that group. The CE generalizes viewer's profiles in each group into a representative aggregation for the respective Adtargeting categories. Adcategory profiles evolve by aggregating all dimensions most strongly in common for the group and most unique across target groups.

In accordance with another feature of the invention, the prototypical Ad group category, behavioral profiles are innovatively parameterized by the Ad and Ad program information (metadata) distribution organizer part of the Ad manager (called Ad server) to compress the targeting models for the bandwidth-efficient download to advertising category membership agents (MemberAgent) residing in field TVs.

In accordance with a further feature of the invention, the field TV MemberAgents reconstruct the downloaded parameterized targeting models, and use a similar CE applied to the TV user's history, created by the TV profiling agent (ProfAgent), to determine the most likely Ad categories the user belongs to and put the results in a user category database. TargetingAndStorage Agents and Presentation agents (PresAgent) in the TV combine these targeting category probabilities, and other relevant information (preference info), to selectively capture, store, and display the optimal downloaded advertisements, including videos and banners, to the user.

The ProfAgent's in the client or field TV's, continually build a knowledgebase of preferences and contextual transition behaviors that profile TV user(s) in the household. The ProfAgent models behavioral interaction with Ads and regular, or entertainment, programs the same way, with, however, possibly different state category names. Preferences for entertainment programs could include affinities for any metadata field or entries in an electronic programming guide (EPG), such as titles, genres, channels, and actors. A transition event occurs between corresponding program EPG entries (e.g., transitioning between programs with different channels and genres, creates a channel and genre transition accordingly. Ads have their version of EPG information that is similar to regular programs. The system learns a user's Ad transition preferences the same way it does for regular programs, except the Ad's genre is its product's Standard Industry Code (SIC), the Ad's title is the product's Universal Product Code (UPC) or SKU code, and the system considers the Ad's actor as the corporate sponsor. Thus the identical data structures and algorithms model user program and Ad transition behaviors.

This information is provided by the head-end in the Ad's metadata in the same way a program's Content Information metadata and EPG precede the broadcast. Hence, the ProfAgent learns product and sponsoring company preference for Ads in the same way genre and actor preferences are learned, as described in detail herein. This enables the targeting of Ads to not only a user's inferred demographic, but to their specific product, corporate branding, or general product category interests. For example, through SIC the ProfAgent can learn if a user likes financial services, or automobile Ads. Similarly, a Pepsi Cola branding campaign could target users who like the soda SIC, or more specifically Coca Cola named Ads. In another aspect, using the UPC, the Gillette company could target users that specifically liked Ads of a Remington model 3000 electric shaver. In yet another aspect of the targeting system, an Ad agency could target users that, for example, likes Apple Computer Company commercials, but does not otherwise like computer Ads. This user may be entertained by their Ads, but have no interest in their product. This could be an opportunity for the Ad agency to focus an infomercial Ad to the user, to bridge the user from brand awareness to product purchase.

Over time, a vast relational knowledge base learns very valuable associations between user TV usage behavior, demographics, programs, and Ad preferences. This knowledge base not only increases Ad targeting within the TV, but also has a revenue generation potential by marketing the aggregated personal information to third parties.

In one instance of the present invention, a TV ProfAgent models patterns of TV usage behaviors with a behavioral model (BM) similar to the clustering engine used at the TV head-end, and extracts key usage information from the BM into a behavioral database. Each entry of the behavioral database has a confidence value generated by a multiplicity of novel techniques presented in detail herein. The database entry confidence registered by the ProfAgent reflects an estimate of the structural and sampling quality of the data used to calculate the database entry.

The TV receives Ad targeting metadata with restricting query terms to display the associated Ad only to selected user's with database entries matching the query constraints. Each Ad metadata query term has a minimum confidence threshold term that specifies the lowest confidence level in satisfying the query term, or terms, acceptable to display the targeted Ad.

For example, an Ad targeting constraint such as 'gender: Male@80% AND age:25-35@50%' has the effect of only showing the Ad to users the TASAgent predetermined had at least 80% confidence in being a male, and at least 50% confidence in being between 25 and 35 years of age.

In another aspect of confidence level specification, there is an expression level, confidence threshold as follows: '(gender: Male AND age:25-35)@80%'. This targeting mode selects for Ad display only users that the system has at least 80% confidence in being male and between 25 and 35 years of age. These methods provide flexibility by enabling Ads to specify the most important targeting selection terms, or to specify a range of people that are close enough to the desired targeting profile to show the Ad to. The TargetingAndStorage (TASAgent) only selects profiles from the database whose aggregate per dimension confidence rating satisfies the query limits set by the Ad targeting metadata.

In yet another aspect of the confidence thresholding system, the query selection filter is stated as a Fuzzy Logic, and not Boolean, expression. The targeting query expression is similar to the probabilistic percentage confidence terms with two notable exceptions: fuzzy membership literals replace the percentage terms, and a fuzzy literal table synchronizes client and server.

By way of example, the query expression mode appears as follows:

'gender: Male@VERY_SURE AND Age:25-35@ FAIRLY_SURE'

This query would select users whom the TASAgent was very sure is a male, and fairly sure lie between 25 and 35 years of age. A fuzzy literal table (FLT) lists the allowable range of fuzzy memberships each advertising category may exhibit. An example of a fuzzy literal table (FLT) is:

Male: [UNSURE, FAIRLY_SURE,VERY_SURE]
Age: [UNSURE, FAIRLY_SURE,VERY_SURE, CERTAIN]

The advantage of the latter expression method is that the novice Ad agency only specifies the degree of confidence required in intuitive, non-mathematical, terms, and leaves the exact range of confidence percentages up to the TSAgent to decide, and continually optimize. Additionally, the fuzzy method handles the non-deterministic meaning of the percentage confidence terms in the database. The TASAgent learns the percentage confidence rating ranges historically associated with each fuzzy performance level.

Other features which are considered as characteristic for the invention are set forth in the appended claims.

Although the invention is illustrated and described herein as embodied in a system and method for behavioral model clustering in TV usage and targeted advertising and preference programming, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DETAILED DESCRIPTION OF THE PREFERRED EMBODIMENTS

Figure 1:
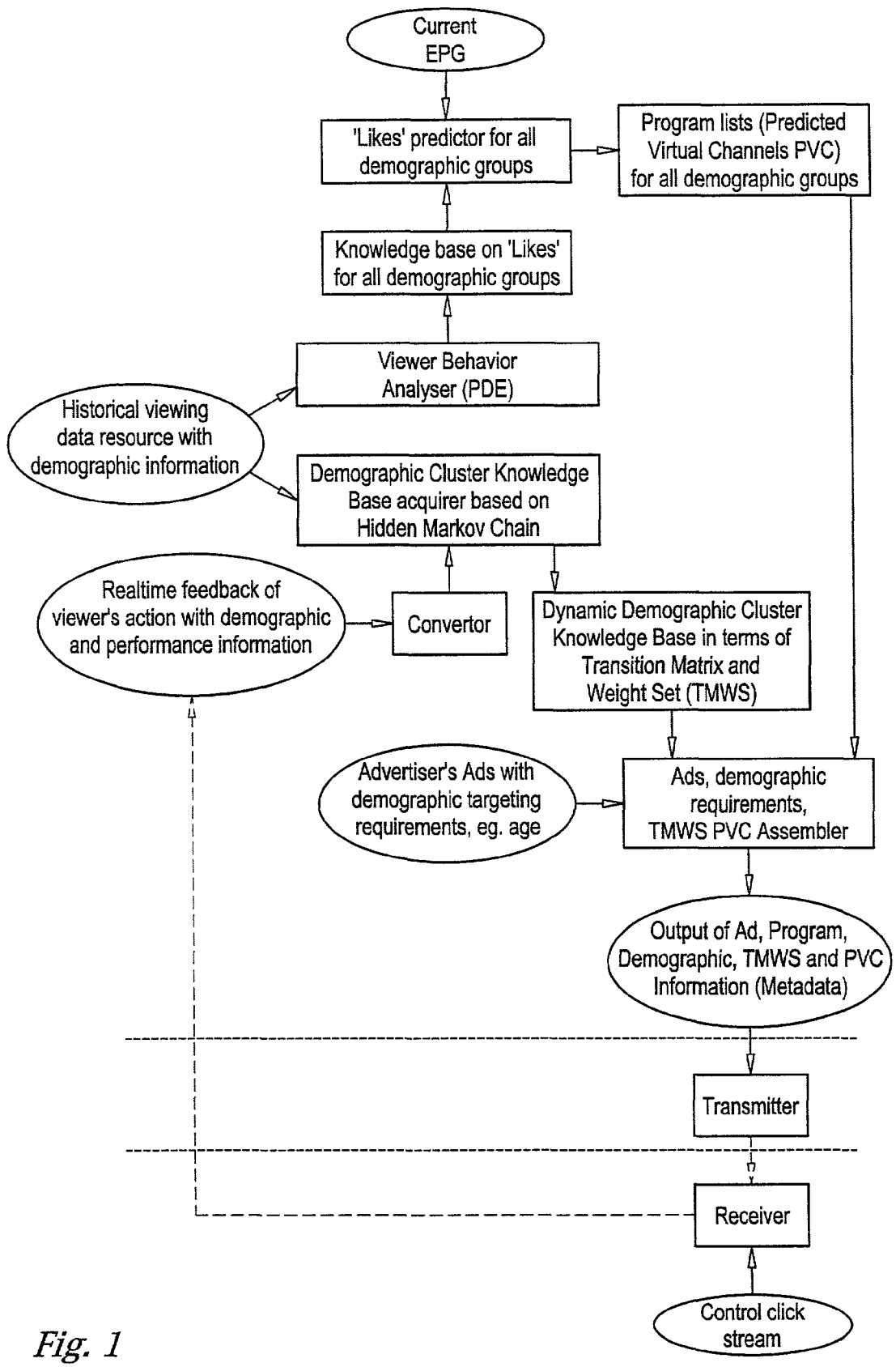
FIG. 1 is a block diagram illustrating the most important modules of the system operator part of the system for program or ad targeting according to the invention.

Referring now to the figures of the drawing in detail and first, particularly, to FIG. 1 thereof, there is shown a diagrammatic overview of a system according to the invention. The core of the invention is the application of a hidden Markov chain and user behavior statistics to model and to predict a TV viewer's demographic group and/or the most popular behavior for an individual demographic group. The main goal is to predict a given viewer's demographic group and/or what programs the viewer would like to watch, and to improve the prediction and modeling accuracy as more realtime viewing data become available.

The system provides two ways to predict a viewer's demographic group, namely, via a dynamic demographic cluster (DDC) knowledge base, and based on similarities between what a viewer watches and the virtual channels predicted by the PDM for the demographic groups.

As noted above, the primary objects of the invention deal with the targeting of advertising content and program content to a viewer or group of viewers who meet certain demographic requirements if such a requirement is given.

The system depicted in FIG. 1 is separated into a head end and a client. Programming, ad content, and sequencing of TV content is determined at the head end. The program stream information is transmitted to the client side in a multi-program stream. As indicated by the dashed line, returning from the receiver to the head end, a program selection feedback provides for realtime information regarding the client's viewing behavior. While the feedback connection is generally available in digital cable systems and other direct connection systems, the invention can also be implemented without the direct feedback. Details of the realtime feedback and the sampled feedback embodiments will emerge from the following description.

The data supplied by outside resources include information concerning the viewing monitor information of all demographic groups which advertiser or content providers may be interested in. Those variables include (a) watch date, (b) watch start time, (c) watch duration, (d) watch channel, and (e) the viewer's demographic information such as age, sex, and the like. The input data further include the information of the incoming electronic program guide (EPG).

The historical data play a role as a pre-knowledge of the demographic groups. These data define the viewers' behavioral information. The system knowledge is limited to those demographic groups at the beginning.

The core of the invention—concerning the acquisition of data for the necessary behavioral model—is the demographic cluster knowledge base acquirer based on the hidden Markov model. The input of the module is the behavioral data and, if available, the click stream feedback. The output of the module is the knowledge base in the form of a transition matrix with weight sets that will be discussed in the following text.

The invention further provides for improvements in the modeling and prediction based on feedback information which includes realtime behavioral data in the form of click streams (e.g., remote control or TV set click sequences).

Figure 2:
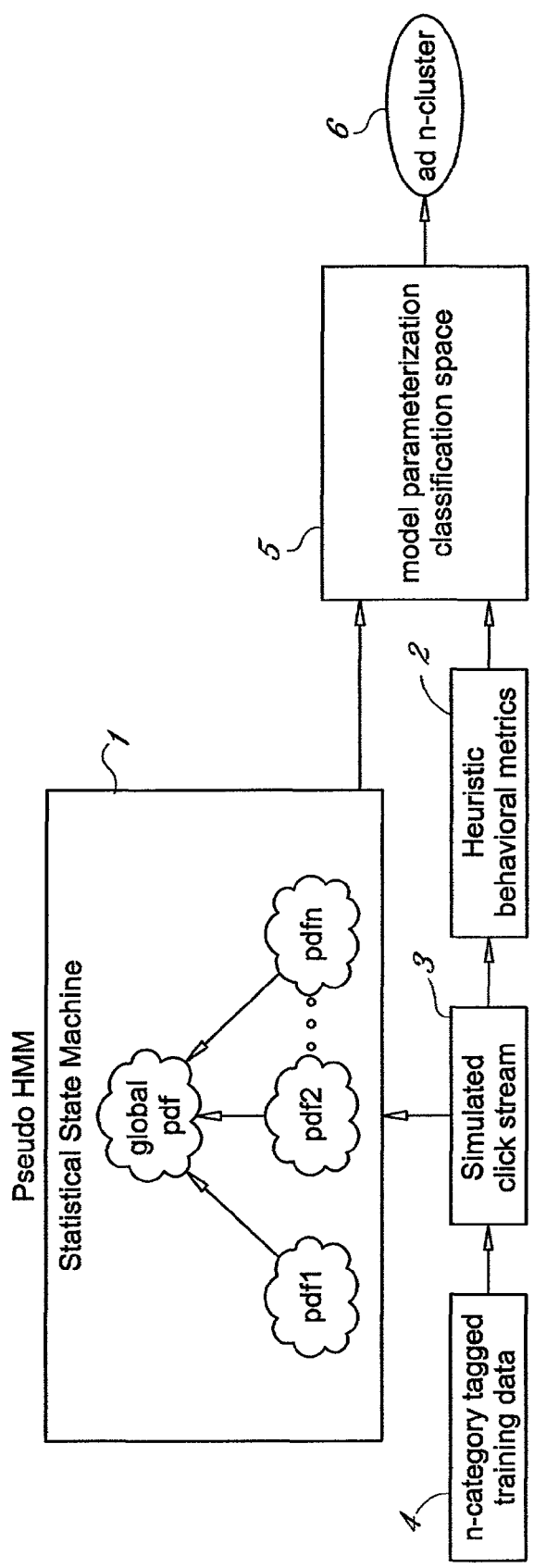
FIG. 2 is a block diagram of a behavioral cluster engine, forming a part of the system according to the invention.

Turning now to various details of the novel system, FIG. 2 illustrates a pseudo Euclidean behavioral cluster engine (BCE) architecture according to one embodiment of the present invention. A pseudo hidden Markov model 1 (pHMM) captures behavioral state transitions. An heuristic behavioral metrics (HBM) sub-block 2 algorithmically detects and statistically represents a multiplicity of predictive TV user characteristics. The TV user's TV control stream 3, e.g. remote control click stream, feeds into the pHMM and HBM. These blocks are parameterized into a highly dimensional classification space 5 delivering a spatial cluster of the training data to subsequent modules 6.

Figure 3:
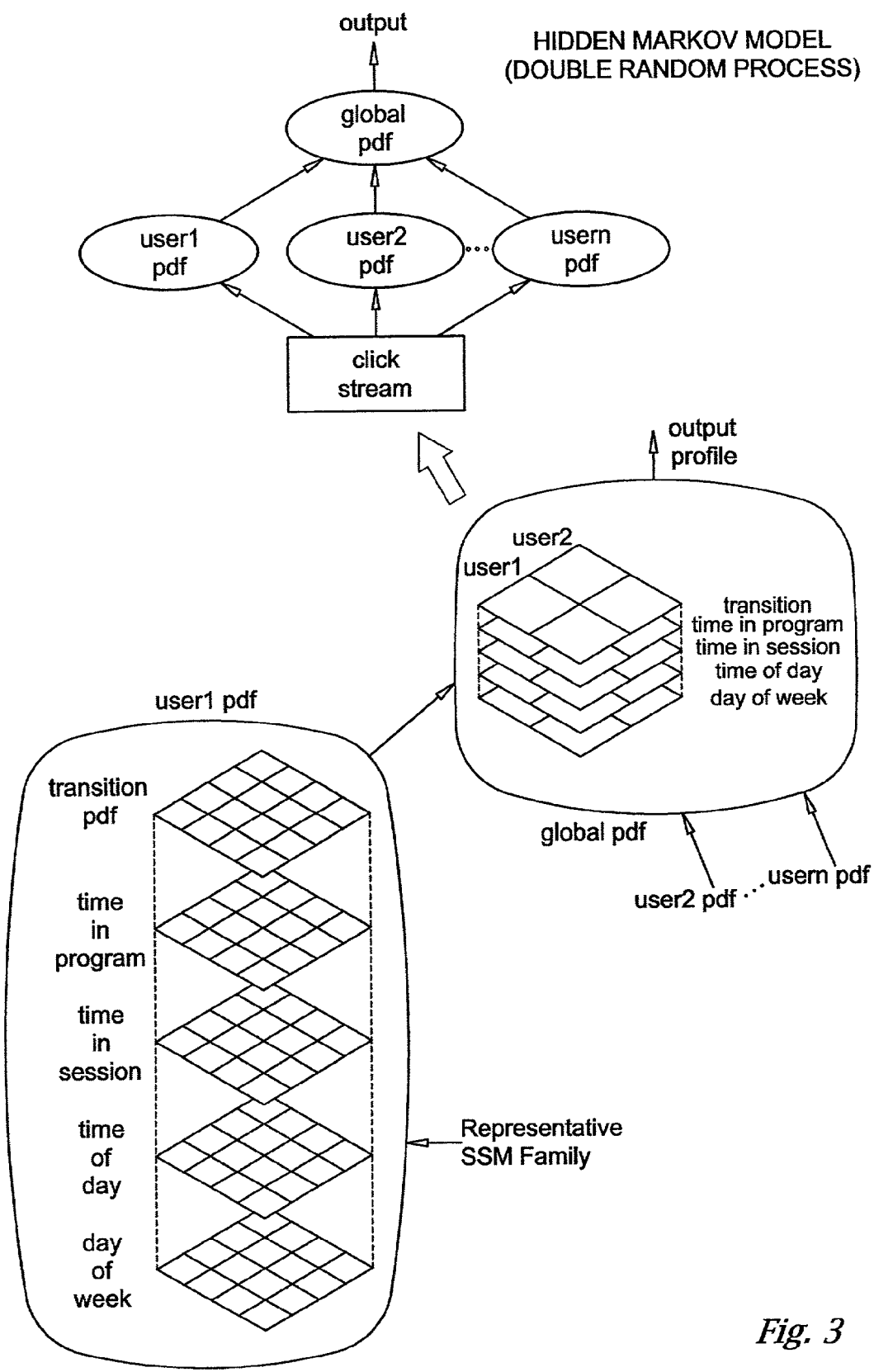
FIG. 3 is a diagrammatic overview over a hidden Markov model with double random processing.

FIG. 3 is a diagram focusing on the pHMM block of FIG. 2. Several statistical state machines work in tandem to model the user click stream. The preferred embodiment has multiple hidden, low level, behavioral processes, and a top-level user transition process. The hidden random processes include channel, genre, and liked title state spaces operating in parallel. The top-level random process, or statistical state machine (SSM), models the likelihood that certain behavioral process activations, and other heuristic behavioral factors, infer a particular user. Each state space has a temporally sensitive transition subspace that tracks various time-dependent user behaviors.

The pseudo Euclidean Behavioral Clustering Engine (BCE) architecture of FIG. 2 represents one embodiment of the present invention. It includes a pseudo Hidden Markov Model (pHMM) to capture behavioral, state transition. In general, the 'pseudo' qualifier indicates this system departs from traditional definition, but maintains substantial similarities as enumerated after a brief description of the HMM.

A HMM is a double random process that has an underlying random process that is not observable and therefore, hidden. However, some aspects of this hidden process are observable through another random process or a set of random processes. The observed random process produces a sequence of symbols, in the present case likely user categories, that we may measure with certain statistical properties. The model seeks to describe both the short time variations in the random process, as well as the steady state features. Of particular concern are the transitions from one interval to another. We generally assume that statistical laws govern the observed temporal variations in the TV viewing process.

The goal of the BCE is to model and group the TV usage and content selection, time series data patterns generated by a TV remote control, or TV, buttons pressed, herein referred to as 'click-stream'. There are two forms of click-stream data; they are real-time and statistically sampled.

Real-time data is what the actual TV system registers from the user TV control commands. This data is sampled at a high rate, and can be any TV control button and it may be accumulated temporarily in a file for later use.

Statistically sampled data are recorded by a third part, such as Nielsen or Arbitron, it generally has detailed user information, limited time resolution, and only logs channel changes of a statistically representative sub-group of the TV viewing population.

Two primary aspects of the Ad targeting system directly depend on click-stream data. First, the profiling agent (ProfAgent) on the TV models TV users through a real-time click-stream and program content information or electronic programming guide (EPG) data. Second, the BCE uses statistically sampled click-stream data and corresponding past EPG data to build advertising category behavioral clusters. All statistically sampled TV user data in the present document, use digitally recorded market research by BARB TV Research corp. (London England) of 1657 British satellite TV users over a six month period in 1998.

A plurality of heuristic measures estimate user preference for TV programs, categories of programming, and certain user behaviors. With these preference measures, a preference determination engine (PDE) uses a voting based, reinforced learning system to assign preference ratings to all EPG entries.

Figure 10:
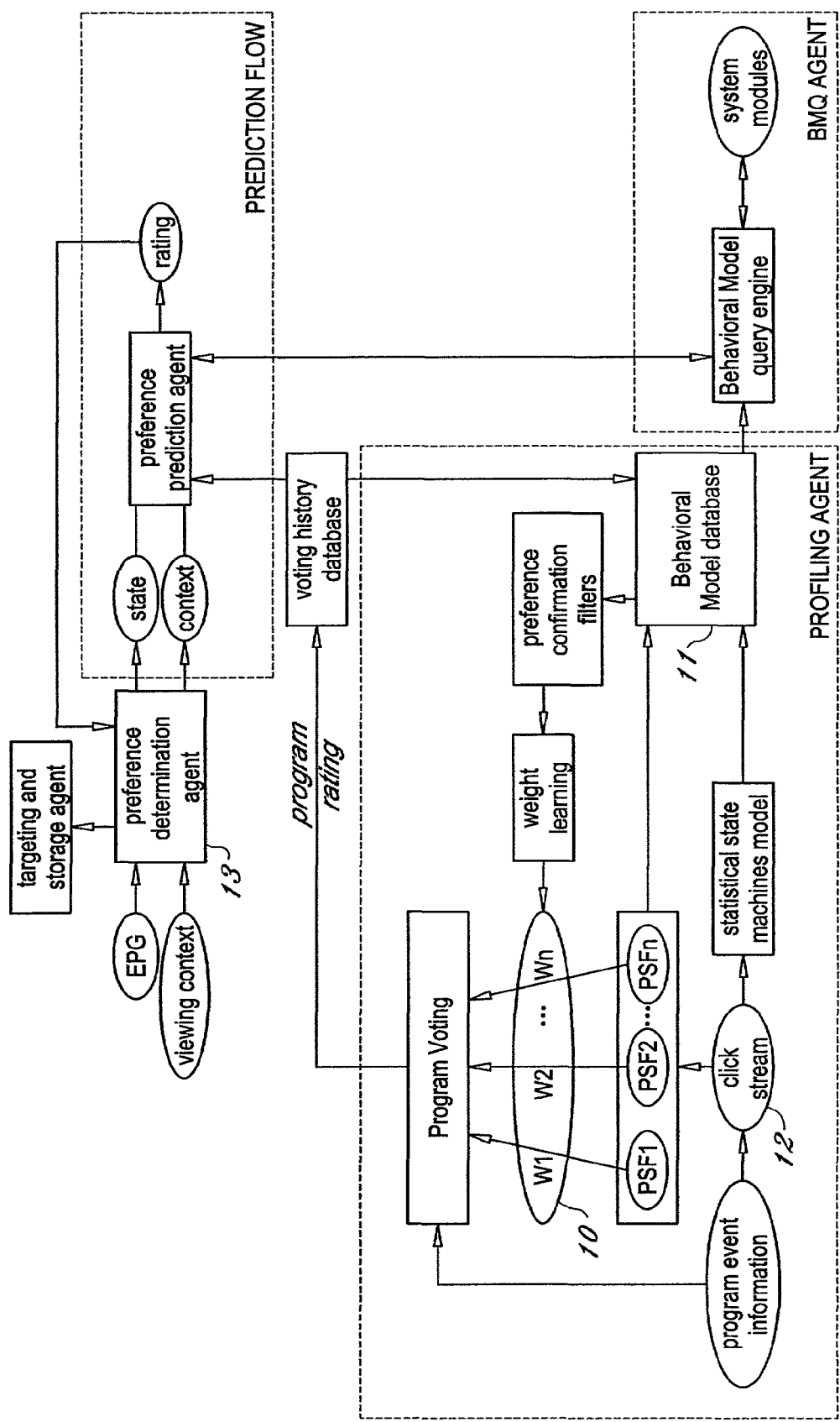
FIG. 10 is a block diagrammatic overview of a preference determination engine architecture.

The preference determination engine (PDE), the architecture of which is illustrated in FIG. 10 provides likes predictors for all demographic groups, i.e., for a group instead of an individual person. The difference between a person and a group is that the determination engine has to pick up the programs which will pleased a majority in a demographic group for a particular time. Additional details of the implementation of the PDE may be found in the commonly assigned, copending patent application Ser. No. 09/893,192 which is herewith incorporated by reference.

The group probability may be determined as follows:

$$P^t_{C_i} = \frac{1}{N} \sum_j^N P^t_{C_{i,j}}$$

where $P_{C_{i,j}}^t$ the probability that a person j of a demographic group i likes the program on channel C at time t; N is the number of persons in the demographic group i, who have the highest probability of watching channel C at the time t.

Then, the channel picked up is the one with highest $P_{C_i}^t$.

The preference determination engine architecture illustrated in FIG. 10 includes a plurality of preference sensing filters 10 (PSF), a behavioral model database 11 (BMdbase), a voting generation layer, output voting weights, and a reinforced teaching mechanism. Each preference sensor filters user behavioral patterns into an analog value proportional to the degree the targeted behavior occurs. The PSF and pHMM receive user click-stream data from a click stream sensor 12, and dynamically maintain the BMdbase 11. The present BM embodiment includes the following novel PSF as defined in the following items:
1. Time_watched/Time_available, for non-surfing, and non-hopping programs
2. Time_missed/Time_available, for all non-surfing programs
3. Time_left/Time_available, for all non-surfing programs
4. Time_watched/Time_available, for programs with hopping
5. Time_between_hops, for programs with hopping
6. Number of hops per program
7. Time independent visitation bias all EPG entries
8. Time in program (TIP) visitation bias for all EPG entries
9. Time in session (TIS) visitation bias for all EPG entries
10. Time of day (TOD) visitation bias for all EPG entries
11. Day of week (DOW) visitation bias for all EPG entries.

While the terms are self-explanatory, we provide a definition of terms as follows:

In item 1, the term time_watched ($T_w$) is the total watch time, possibly not contiguous, for a particular program. Time_available ($T_a$) is the program length. The ratio Time_watched/Time_available ($T_w/T_a$) indicates how much of a program the user viewed, and statistically reflects their interest in the content.

In item 2, the term Time_missed ($T_m$) is the amount of a time a user comes late to a program (negative if early). The ratio Time_missed/Time_available ($T_m/T_a$) reflects the users eagerness, and possible planning, to see the start of the program, hence a greater program preference than if the user often starts late. If negative, it is an especially strong indicator that the user spent more effort in planning, and hence has a greater preference, to see the program's start.

In item 3, the term Time_left ($T_l$) is the time of the program's end minus the time the user leaves the program (negative if stayed after end). Time_left/Time_available ($T_l/T_a$) is a ratio to gauge a user's interest in not missing the program's end, hence a greater preference for the program than if the user often leaves early.

Taken together, these measures determine the quantity and quality of possible time spent watching a program. As shown in FIG. 10, most people tend to tightly group in each of these metric. The result is a good correlation with program preference. Exactly similar conclusion and measures as $T_w/T_a$, $T_m/T_a$, and $T_l/T_a$ applies for advertisements as well as programs.

Preference metrics related to program hopping, items 4 through 6, estimate program preference in relation to the hopping behavior. A program hop is the act of leaving and returning to the same program. A program surf is the act of going to, and leaving from a program within a certain short period of time, e.g., 5 minutes. When a user returns to a program, that is a strong indicator that there is something about the program worth returning to, or liked. FIG. 11a graphs the $T_w/T_a$ for programs with hopping. It will be understood that programs with hopping are watched longer than those in the non-hop case. A hop indication thus is an indication of greater preference.

In item 5, the term Time_between_hops designates the time (in minutes) the user was away from the original program before returning. As illustrated, most users had hops that were less than 2% of the program. Beyond the intuitive appeal of this metric, this data combined with the above preference bias for programs with hopping, demonstrate at tendency that the shorter the time away, the more the user prefers the original program.

With a similar intuitive and observational appeal, the number of hops per program of item 6 is an inversely proportional proxy for user program preference. That is, the more often a user hops back and forth in a program, the less they like the program. FIG. 11c indicates that most people hop only once or twice in a program with any hopping. It is important to note, that the higher frequencies of hopping are increasingly rare, and thus not preferred since most hopped programs have a relatively high $T_w/T_a$ ratio.

Yet another novel class of program preference metrics are based on a unique method to determine user behavioral bias, items 7 through 11. User bias, as used herein, is the prejudicial focus of behaviors to select a significantly limited subset of possible choices. With this concept as the motivation, bias takes the theoretical form of a ratio of the expected uniformly random selection spread verses the observed behavioral selection spread. User behavioral bias is a psychometric tool that measures the psychological bias of a user to choose a target behavior over other options in its behavioral domain. A mathematical treatment of the bias metric subsequently follows a summary of its application in user program preferences.

The behavioral bias metric can determine if a selection in question has enough evidence to infer that user selection is a preferred action. More specifically, it indicates the likelihood of a non-uniformly random selection process. For example, if the selection of a certain channel occurs with the same likelihood as random, then there is no evidence of a user selection bias, and the channel is assumed as not preferred. In the converse situation of the selection being several times more likely than random, then the channel is deemed preferred.

Similarly, the preference vote of item 7, returns the overall bias to visit any particular EPG entry. Items 8 to 11 are temporally restricted bias queries.

Item 9 returns a vote on the bias to make a certain selection at a specified time after the start of a TV viewing session. A session is the TV usage period that starts at the turn on, and ends at the turn off of the TV. A visitation bias is the content, or category, visitation frequency over random.

Similarly, item 10 restricts the bias query to the time of day, and item 11 is a day of the week selection preference query vote. The prescribed bias metrics are superior to the prior art in that the latter calculate absolute frequencies of something happening and not the relative likelihood of a particular observed event frequency occurring. In any short period of time a uniformly random process can appear to prefer some possibilities over others and trick a frequency based preference determining system to infer a user preference. However, in such a circumstance, the present bias detection scheme would indicate there are insufficient samples or they are not concentrated enough to infer a user preference. This has the effect of lowering the confidence in the poor quality, visitation frequency based metrics, and lowers their contribution to the final program preference evaluation; thus increasing accuracy by rejecting statistically erroneous sample data.

In addition to EPG entry related preference, several behavior related preferences are contemplated, such as those described herein. Behavioral preferences provide a mechanism to make program preference predictions in the context of a user's past patterns of action. It is often the case that a viewer's mood, or contextual circumstances including temporal queues, can influence preferences in a way that has a program liked in one context, and not preferred in another. To the extent the BCE models the behavioral context of interest, a more accurate programming preference prediction is possible.

The behavioral model database BMdbase 11 of FIG. 10 is serviced by a standardized behavior model query engine. The corresponding target query of the behavioral model (BM) data will now be described in the following:

All modeled behaviors and temporal relationships in the BCE, as described herein, serve as the BMdbase for system modules to query with the viewer's real-time usage pattern in a TV session, and not simply make the estimation using the users average preference for a program. The BMdbase is a behavioral preference query server to any system module requiring certain behavioral likelihoods to make a more optimal decision. Modules that query the BMdbase include the preference determination agent (PDE) 13, the TASAgent, and the PresAgent. The behavioral model query engine (BMQengine) services all search queries to the BMdbase.

Any environment state variable (such as TV volume), or EPG entry (e.g., channels), or their derivatives, is potentially a hyperplane in dimension 1, below, of the behavioral model. The preferred behavioral transition model has five dimensions (Dim) as follows:

Dim 1—[likedTitle, likedChannels, unlikedChannels, surfChannels, likedGenres, unlikedGenres, surfGenres]

Dim 2—[from State code, i.e., channel, or genre, or Title ID number]

Dim 3—[to State code, i.e., channel, or genre, or Title ID number].

Dim 4—[nonTemporal, DOW, TOD, TIS, TIP]

Dim 5—[temporal fuzzy bin]

Dim 1 selects the type of state variable.

Dim 2 sets a constraint for the 'from' state of interest with the reference ID. A 'from' state is the state the viewer leaves when making a state transition.

Dim 3 sets the 'to' state ID for the query. The 'to' state is defined exactly as the 'from' state, except it is the state a viewer goes to upon a state transition. The reference IDs could be channel call letters, such as 'ABC', genre names such as 'movie', or title hash codes.

Dim 4, the type of temporal relationship; and,

Dim 5 the corresponding time interval; e.g., valid selections for DOW are: Mon., Tue., Wed., Thurs., Fri. Sat. and Sun.

There are approximately 14 to 16 fuzzy membership categories that provide a dependable fuzzy model. The number of members within the categories may be set to vary from about seven for relatively unimportant membership categories (time_left/time_watched ratio), to about 17 for the most important categories (e.g., time watched).

In addition to BM search constraints, there are functional specifications (specs). Function specs include, but are not limited to, the following:

QueryFunction—[mostLikely, leastLikely, Top_n, Bot_n, time_sum]

The 'most' (least) likely search function returns the highest (lowest) probability states and bias values that satisfy the rest of the query constraints. 'Top_n' (Bot_n) returns number 'n' the highest (lowest) probability states and bias values that satisfy the rest of the query constraints. The 'time_sum' function aggregates all the bias terms (by averaging, or counting, etc.) in each specified TimeType's TimeValue intervals. Thus, a general transition query format is:

'[QueryFunction][StateType][fromStateID][toStateID] [TimeType][TimeValue]'

By way of example, the following query searches for the top 5 liked genres on Sunday:

'QueryFunction=Top_n=5, StateType=LikedGenres, fromStateID=null, toStateID=null, TimeType=DOW, TimeValue=Sunday'

A typical query result, where 100 is the maximum preference, is

[action=60, news=40, comedy=30, null, null]

if only three genres were liked on Sundays.

A typical use of 'time_sum' is to search for the most likely time of activity for a given StateType. For example: Find the top 3 most likely times of day a user watches TV. The query is 'QueryFunction=time_sum, StateType=LikedChannels, fromStateID=null, toStateID=null, TimeType=TOD, TimeValue=null'.

In this case, the 'time_sum' function will aggregate all transition biases per TOD interval, and return a list of results. If the person is most active in the mornings, evenings, and late night then a typical query response could be (';' implies a new row, and ',' a new column):

[(late_night,very_often); (wee hours, never); (early_morning; never); (morning, mostly); (late_morning; rarely); (after_noon; rarely); (late_after_noon; sometimes); (evening; almost_always); (night, typically)]

A module with a defuzification table searches the returned matrix for the top three likelihoods, namely,

[(morning, always); (late_night_very_often); (evening; almost_always)].

A multitude of standardized query interfacing are readily practical to interface with the BMQengine. For example, a SQL interface would specify the dimensional attributes as 'SELECT . . . FROM . . . WHERE' clauses; e.g., If the most likely, or popular, TIME for watching MOVIE.ACTION is in the evening, the SQL query is:

(SELECT view_start_time FROM preferences
   WHERE genre_main='movie'
   AND genre_sub='action'
   AND view_day_of_week=(SELECT view_day_of_week
     FROM preferences
     WHERE genre_main='movie'
     AND genre_sub='action'
     GROUP BY view_day_of_week
     HAVING MAX(BIASview_day_of_week));)
   GROUP BY view_start_time
   HAVING MAX(BIAS_view_start_time));
)=9 pm A basic SQL interpreter converts SQL search parameters into BMQengine dimensional attribute constraints. For this example, QueryFunction=mostlikely, StateType=LikedGenre, fromStateID=null, toStateID=movie:action, TimeType=TOD, TimeValue=evening.

Although a wide variety of modeled behaviors, and query architectures are contemplated, there are still many others. The following is a general enumeration of some behavioral preference categories. Here, the outputs depend on the real-time viewing context:

1. Time sensitive transition preferences for all EPG entries
2. State-sequencing
3. Transition reversal bias
4. Time watched per session, and per all EPG entries
5. TV control patterns of behavior
6. $T_w/T_a$, $T_m/T_a$, and $T_t/T_a$ for all EPG entries
7. EPG entry and behavioral diversity focus (breadth, depth search control)
8. Most likely starting, or ending, state In item 1 the BM produces time sensitive, and time independent transition likelihoods for any EPG entry. Every EPG entry class is further segmented into a plurality of behavioral categories, including surf/non-surf, hopping, and liked/unliked states, as previously defined. Each user action creates transition statistics in each of these domains according to the SSM algorithm.

An example, is a query to the BMQengine for the likelihood that a particular actor (or any EPG field entry) is watched after watching the news (or any other EPG field entry), with no time constraints. A typical time sensitive preference query would look like:

'what is the likelihood of watching sports on Monday (or any day)
AND
in the evening (or any time),
AND
after watching TV for an hour (or any amount of TV watched time),
AND
while half way into the current program (or any amount of program watched time).

Importantly, the query can be relaxed with less conjunctive terms, or tightened with more constraints. Using this mechanism, a system module can pass the real-time contextual information to the BMQengine, and discover that although the user loves sports in general, he/she does not like to watch it on Monday evenings within an hour of watching TV, midway into another program. This highly specific case is a demonstration of the high detail of learning and contextual preference possible in the present system. The system module send the full range of query abstraction levels, i.e., from very general (e.g., find liked genres), to a fully conjunctive EPG, temporal, and state sequencing likelihood search. The system module finds the most likely level of query abstraction, and rates programming by their distance from its query parameters.

For example, if a sports program is to be rated, the first, and most abstract query, might be 'is sports liked', then subsequent queries will increasingly add constraining terms depending on the real-time context, like 'is sports liked on Monday evenings after watching the news', and an even more specific query might add 'on channel 2' to the latter query, and so on. If the last, and more specific, query was most likely, then a sports programs on Monday evening, after watching channel 2 news would rate higher than the same sports program if these behavioral constraints were not met. In the PDE query case, the closer (farther) a program is to the most likely behavioral constraint, the higher (lower) the behavioral voting contribution is to the PDE rating.

In yet another aspect of item 1, the BMQengine supports a query for the most likely transition given a modeled context parameters (i.e., EPG entries, timings, behaviors). The BMQengine responds with all probabilities that match the query terms, assuming unconstrained model dimensions are a wildcard. Thus, the BMQengine recursively applies the constrained dimensions across all unconstrained behavioral dimensions. For demonstration sake, we assume the BM models day-of-week (DOW), and time-of-day (TOD) for liked titles, channels, and genres. A typical query and response appears as follows.

Query: 'what are the most likely genre transition from genre=weather, DOW=Monday, and TOD=evening'.
Exemplary response: 'genre=comedy, bias=medium'.

If any term is not specified, then the BMQengine searches all entries of the unconstrained dimension for query matches. For example, if DOW was omitted from the last query, then each evening would be searched for the most likely transition genre from 'weather'. A possible query response is '[genre=drama, DOW=Tuesday, bias=high]', if the most likely transition from genre=weather is to a drama is on Tuesday. If the control term of the last query 'most likely' was changed to 'all', then every destination genre during any evening with a transition from weather would be returned.

The same mechanism provides for finding the typical amount of time a user tends to hop away from a liked program. This behavior could arise from skipping commercials, or time sharing with consistently competing content. An example of a query to find the top 2 most likely hopping times for the program named "Seinfeld" appears as follows:

Query: [QueryFunction=top_n=2, StateType=Title, fromStateID=null, toStateID='Seinfeld', TimeType=TIP, TimeValue=NULL]. If the person usually only skips Ad breaks at 2 minutes, and 15 minutes after the start of Seinfeld, in 30 and 50% respectively of all transitions to the show, then the fuzzy time bin, query response would be [(QUICKLY_SURFING,30); (VERY_SHORT,50)].

Using transition context information enables the PDE to assign better program preference ratings, and permits the PresAgent to order programs on a virtual channel in a user preferred program order and time.

A state-sequencing query, item 2, addresses the likelihood that selected EPG entries are part of a preferred state sequence, and returns the probabilities and states observed. A state-sequence is defined as any contiguous set of state transitions greater than one. Each modeled state transition matrix has a companion state sequence table. Instead of storing the actual permeation of observed state sequences, state sequence table logs the states visited and their frequencies. Since human behavior rarely repeats with exacting precision, it is more important to parameterize transition sequences to match behavioral tendencies. Thus, there are two ordered tables. One two-dimensional table has its rows as the unique combination of visited states in an observed sequence, and the columns are the IDs of the visited states. The rows are sorted by column vector length, and the columns are alpha-numerically sorted. This sorting speeds searching the table for a given query pattern. A corresponding table, effectively a third dimension, accumulates the number of times a state was visited in the sequence. Each time the same combination of states are visited in a transition sequence, the per state visitation frequencies are added to this count. An, effective, fourth dimension accumulates the sequence lengths of sequences of matching visited states. A fifth, and final, sequence modeling dimension counts the number of times a particular state sequence combination row occurs. This dimension is used to calculate the average sequence length, and average number of times a state in a sequence was revisited. A state visitation sequence match occurs when the states visited in a new sequence exactly matches a states visited row entry. When a match occurs, the state visitation frequencies, and sequence length, are added to their respective dimensional accumulators. Otherwise, a new row entry is appropriately created.

Figure 13A:
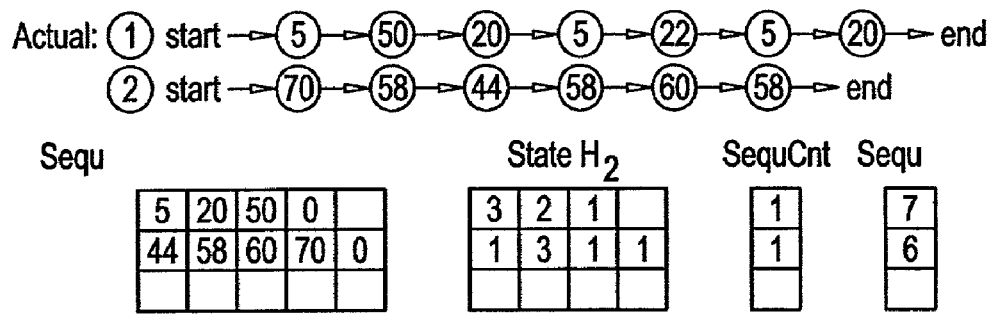
FIG. 13 is a state sequence model.
Figure 13B:
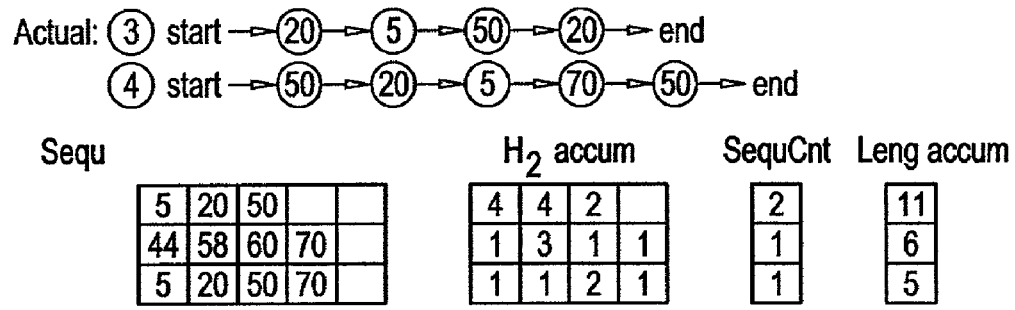

FIG. 13 illustrates a typical example. The example is for channel states, but the algorithm applies to any state sequence modeling. FIG. 13A shows an originally empty database after processing two sample state sequences. The two sequences have at least one different visited state, resulting in two new row entries. In FIG. 13B, two additional sequence examples are processed. Sequence three, although not the same as sequence one, is aggregated into the same row entry as sequence one, since exactly the same states were visited. Sequence four differs by one state, thus a new dbase entry is created. Sorting columns and rows continually, or periodically, makes query searches more efficient.

A typical sequence (Sequ) likelihood query format appears as follows:

[QueryFunction][StateType][sequStateIDs][LengthValue]

The 'QueryFunction' term has the same parameters as the transition query case. Additional 'StateType' attributes identifies the type of state sequence to select, e.g.: ChannelSequ, GenreSequ, TitleSequ, SurfGenreSequ, SurfChannelSequ, or any EPG entry such as ActorSequ, etc. The query constraint terms 'FromStateIDs' and 'toStateIDs' are similar to the prior transition query case, except they each are a list of either already visited, or yet to be visited states, respectively. The query term 'LengthValue' constrains the average sequence length to search for. Some typical sequence related BMQengine query examples follow.

Example 1

Find the top 5 most likely channels that complete a non-surfing viewing sequence, given the previously visited channels 30 and 40, the query constraints are
QueryFunction=top_n=5, StateType=ChannelSequ, sequStateIDs=[30,40], LengthValue=null.
If channels 43, 58, and 60 were the most likely to complete the sequence, and their probabilities are 80, 10, 20 and percent respectively, the query result would be:
[(43,80), (58,10), (60,20), null, null].

Example 2

Find the top 5 most likely channels that complete a surfing sequence three channels in length, given the previously visited channels 30 and 40, the query constraints are
QueryFunction=top_n=5, StateType=SurfChannelSequ, sequStateIDs=[30,40], LengthValue=3.
If only channel 43 was the most likely to complete a surfing sequence three channels in length, and its probability is 80, the query result would be
[(43,80), null, null, null, null].

Example 3

Out of all sequences of at least 4 programs, find the probability of watching the following three programs sequentially—Friends, Frasier, and Seinfeld (assuming they were chronologically concurrent or consecutive).

QueryFunction=mostLikely, StateType=TitleSequ, fromStateIDs=["Friends", "Seinfeld", "Frasier"], LengthValue=4.

A typical query result if these query constraints were observed in 20% of all sequences with LengthValue at least equal to 4, is [20].

In each of these examples, the channel, or sequence probabilities are calculated by simply counting the number of times a query satisfying state was visited, out of the total number of similarly constrained records. A more complete model of behavioral sequences additionally includes single transition information to statistically infer the most likely permutation. The novel sequence modeling method set forth employs the 'states-visited' model information, above, to infer observed combinations, and BM state transition information to estimate the most likely permutations, i.e. sequence order. The advantage of this sequence modeling method, is to significantly filter noisy behavioral sequencing data, and save memory, while preserving characteristic state sequencing information. It is well know that the memory requirement of storing all possible permutations of numerical sequence grows with the factorial of sequence length. In the TV environment this is often a prohibitive, and wasteful use of limited resources. A pessimistic estimated probability of a particular sequence order occurring is approximately equal to the product of the probability of matching sequence parameters (i.e., length, states, and states visitation frequencies), and the probability of each transition occurring. Since each sequence transition is not independent of the prior one, this estimate is clearly a lower bound. A variety of heuristics are contemplated for comparing the relative likelihood of one permutation over another by considering the directional bias of each transition. In short, a permutation is more likely if its transition directions have a significant bias over the reverse direction. A simple heuristic to calculate an ordering likelihood metric is to sum the difference of the forward minus the reverse direction transition bias for each sequence step.

With this information, a system module can estimate the expected likelihood that a state is in a specified sequence. For example, if a TV user starts viewing CNN, and switches to FOX, a query to the BMQengine could return the most likely channels to come, and there likelihoods. As shown in more detail herein, this information could be used by the PDE to bias the preference of a program, or a program's sequential placement by the PresAgent in a virtual channel.

Transition reversal bias, item 3, seeks to detect any directional bias to a user's state transition behavior. An example is if a viewer tends to move from CNN to PBS, but rarely from PBS to CNN. Similarly, for genres, a user may prefer to more often watch news before long drama movies. Many such preference may arise in Titles, or any EPG entry. System modules sensitive to program sequencing can use reversal bias to predict the viewer's preferred programming order. The PDE uses the directional bias to influence a program's preference rating to the transition context of a viewer's recent history. For example, assume a user just watched news, and the PDE must calculate the most preferred programs in the EPG to suggest for viewing. In the case where the PDE otherwise rates programs on CNN and PBS equally, it would rate the PBS program high if there was a significant transition bias from CNN to PBS over the reverse case. MemberAgent uses this as a behavioral parameter to identify classes of viewers. State directional bias assists the PresAgent to better sequence the program guide for virtual channels.

Information such as typical time watched, item 4, per EPG entry and TV session, helps system modules better match a viewer's attention span for specific types of content. If a viewer tends to have short TV viewing sessions, then shorter programs get higher ratings than longer ones. If a user tends to watch action movies for a much shorter time than comedies, then programs in the respective categories are incrementally preferred accordingly. In principle, attention span applies to all EPG entries, and most principally to channel, genre, title, and actors. Attention span potentially separates viewers (for the MemberAgent), and directly effects their preferred mix of content viewing times (for the PDE and PresAgent).

Monitoring TV control patterns, listed in item 5, is a significant tool in identifying users behaviorally, and often motivates program preference conclusions. A typical example is modeling a users control behavior of the mute and volume buttons. The PDE uses the mute button as an indicator of less preferred programming. In the context of Ad watching behavior, the MemberAgent uses the mute button to learn types of Ads a user may not like. Other TV control buttons, such as volume control, offers similar predictive potential. If a users raises the volume of a certain program, then they are more likely to like that program. With respect to user identification, teenagers may be more likely to significantly raise the volume of music videos than mid-aged adults. Similar, modeling and query mechanisms as in temporal modeling applies, except time interval plains are substituted for the appropriate control parameter intervals.

The same $T_w/T_a$, $T_m/T_a$, and $T_l/T_a$ in program preference ratings, similarly apply to behavioral preference ratings, as in item 6. Through a user's viewing history, any EPG entry will have an inferred preference associated the user's program viewing behavior. For example, if a viewer is often late in watching programs with a certain actor, then the state corresponding to this actor would have a high $T_m/T_a$ ratio. Similarly, for every combination of PSF and EPG entry SSM.

As a further metric, item 7 brings forward the importance of curiosity, and diversity psychometric behavioral parameters. Diversity measures seeks to characterize a user's spatial coverage in each domain of interest. Any modeled state domain receives a focus rating calculated by dividing the selections visited by the total selections available, during a certain period of time; e.g., channel_diversity=number_of_channels_visited/total_number_of_channels. Different behavioral state classes, or EPG entries, have their own diversity measures; e.g., genre diversity etc. Different people tend to have a wide range of domain diversity measures that characterize them. Older people may have fewer channels they watch than teenagers, for example. Similar to diversity measures, focus measures apply to cross dimensional, often hybrid, domains. These hybrids are often behavioral derivatives of EPG entries, and not direct measurements of EPG selection spreads. For example, Channel Sequence and surfing focus, measure how few unique states make up all observed sequences or surfing. Another psychometric class are curiosity measures. Curiosity measures estimate a users psychological tendency to explore a particular category of content. For example, channel_curiosity is the ratio of the number of liked channels, out of all channels non-surfed. The lower this ratio, the more the user explores channels that they have not previously liked. A person who is not very curious, would tend to stick only to things that they have liked in the past, and would have a very low curiosity rating.

The preference determination engine PDE uses diversity, focus, and curiosity metrics to determine the appropriate mix of highly rated programs to suggest for viewing. Taken together, these measures control the breadth, and depth of programming predictions presented to the viewer. For example, if a viewer has a low genre diversity rating, the PDE would concentrate top program suggestions within the fewest number of genre categories, and conversely if the rating was high. People tend to have a predictable range of diversity and curiosity ratios. As used by MemberAgent, the combination of these measures tends to separate individuals and the classes they belong to. With respect to the PDE, if, for example, their channel curiosity rating is high, the PDE gives suggestion preference to channels not previously watched often. The PresAgent, having a similar task as the PDE, creates virtual program viewing guide that tends to match the daily variation and novelty that a user prefers.

The most likely starting, or ending, state of item 8 is an important parameter for all modules. The PDE uses starting, or ending state likelihoods to bias program ratings to according user history when turning on and off the TV. These parameters, also, help identify users for the TASAgent. The PDE couples ending state information with session duration predictions to bias programs towards ending state preferences as the actual session time approaches and surpass the expected TV session end time. The PresAgent applies a similar principle when constructing a time appropriate virtual programming guide. For example, if at a certain time and programming state, a user often end their session on a certain channel, then any programming on that channel will get a preference rating bias. In general, such rating biases are relatively small, and are meant to give preference to programs that are otherwise closely rated, but have some contextual bias, such as sequencing.

It will be understood that the above are exemplary embodiments and implementations of the invention only. A wide variety of permutations and variations on the preference metrics are well within the scope of this invention.

The following description provides details concerning the behavioral model processing according to the invention.

With reference to FIGS. 2 and 3, each user's action, or selected non-actions, creates parallel SSM transition events in each of three SSM state spaces: Channel, Genre, and Title. These state space categories each have temporally dependent and independent dimensions. The first dimension, from top to bottom, is time independent, and notes any state transitions whenever they occur. The second SSM dimension tracks the time_in_program, namely, how long since the last transition, a state transition occurs at. Dimension three models transitions relative to the time since the start of a TV session. The fourth SSM dimension detects time of day patterns of behavior, and the fifth day of the week. The goal is to detect periodic sequential events that have some degree of relative temporal or sequential bias. Each state space dimension has a transition matrix acting as fuzzy bins to quantify the temporal membership to which a state transition sequence belongs.

Figure 4:
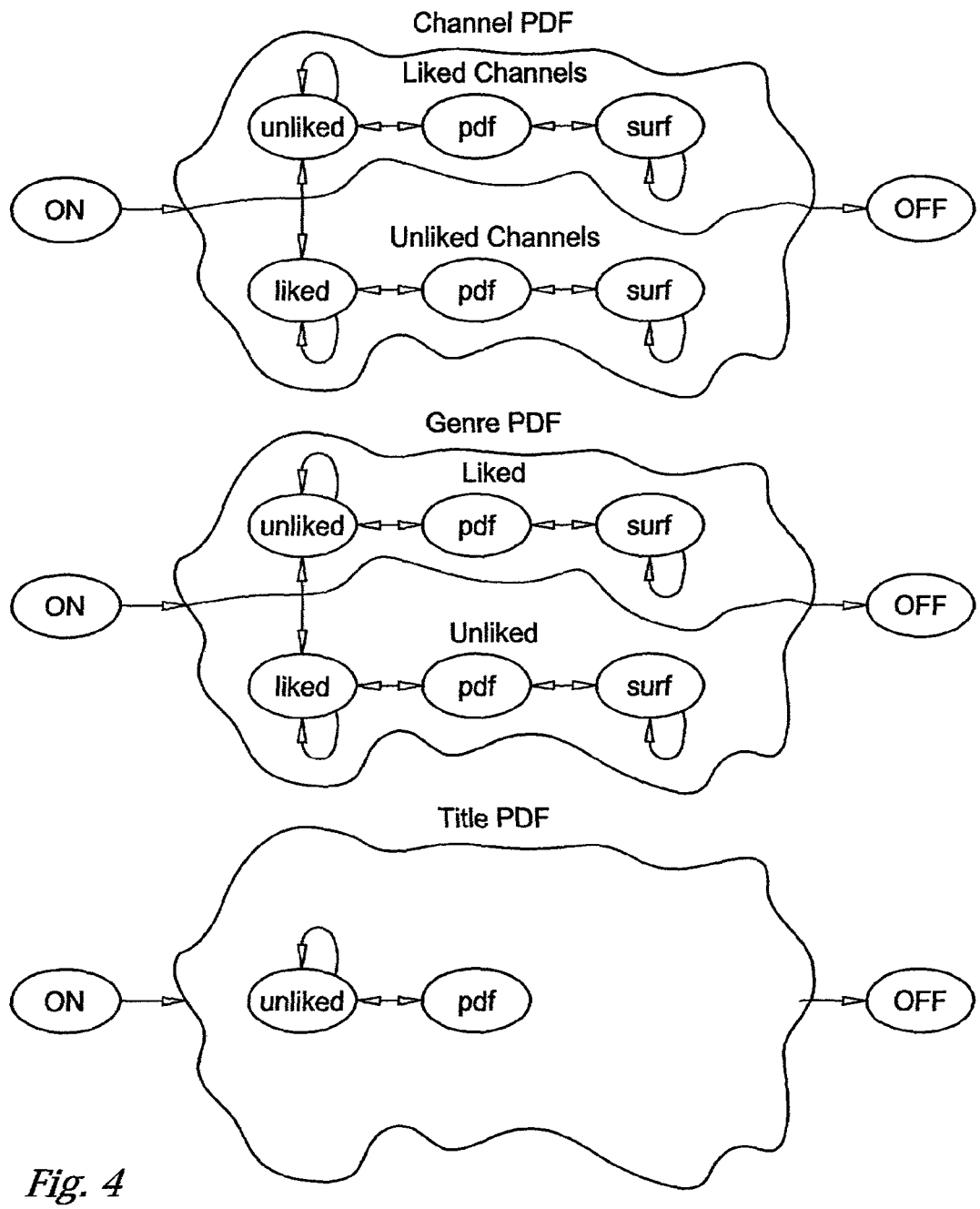
FIG. 4 is a diagram illustrating a statistical state machine with three state spaces represented in probability density functions.

For example, the Time of Day dimension for the channel, genre, and title SSMs, consists of mutually exclusive transition matrices that enter each state transition in one of the following time matrices:

Late_Night, Wee_Hours, Early_Morning, Morning, Late_Morning, After_Noon, Late_After_Noon, Evening, Night FIG. 4 graphs an instance of the preferred state space, and the legal transition flows within each statistical state machine (SSM). Inside any of the probability density functions there exists only one state at a time. The SSMs of the preferred embodiment are liked titles, channels, and genres; and unliked channels, and genres; and surf channels, and genres. Each SSM contains fixed and variable states. Fixed states describe transitions between SSMs.

The first fixed state for all SSMs is the OFF state. The OFF state occurs when the TV is off.

The SSMs modeling liked state transitions have as the second fixed state the UNLIKED state.

Conversely, the SSMs modeling unliked state transitions have as the second fixed the LIKED state. Channels and genres viewed for less than a certain threshold amount of time, e.g. 5 minutes, count as surfing transitions.

The non-surfing SSMs have a third fixed state called SURFING. The state SURFING is active when the user views a program for less than the surfing threshold. The channel and genre surfing SSMs have only the OFF and NOT_SURFING fixed states. Variable states for state spaces are ideally all states possible to visit. However, practical resource constraints often significantly limit the number of states that can be fully modeled. One method to compress the BM without significant errors is to only have the most representative, or preferred, of each state space included and enumerated as variable states in the SSMs.

A preference determination engine (PDE)—see FIG. 10—assigns preference ratings to titles, channels, and genres. The maximum number of states resources permits are taken from the top ratings in each category. States in surfing SSM models are a union of liked and unliked SSM states. As with any state machine, the SSM can only be in one state at a time. For example, when viewing a liked channel and transition to an unliked one, the 'to' state would be the UNLIKED fixed state of the Liked Channel SSM, and the 'from' state in the Unliked Channel SSM is the LIKED fixed state.

Transitions between variable states define the block named probability density function, or 'pdf', as it models the likelihood for any particular behavioral state transition to occur. Variable states are added to and deleted from the pdf depending on their statistical significance over time. In practice, most TV viewers may individually visit fewer than 30 of 100 channels and 50 of 100 genres over the course of six months. Using this observation, a systems designer under limited systems memory constraints can significantly reduce system resource requirements, and yet continue to capture the vast majority of a user's behavior. Up to a certain limit, the present invention's performance is proportional to, thus scalable with, the number of top preferred states in the SSM. The lower limit on the number of required states tends to come from minimum required performance on individuals that are very similar, but different in very subtle ways. The upper limit is set by the diminishing performance benefit of adding states, verses the penalty of system resource constraints. To find an optimal limit, a simulation sweeps model resource parameters over a statistically representative population sample of TV viewing behaviors. Such memory usage optimizations are most critical in the TV ProfAgent. In a real-time model building mode, A certain number of temporary states are continually necessary as the ProfAgent builds enough evidence to determine which to include into the SSM, or reject as not active enough. Upon reaching an available memory limit, the agent deletes the least preferred states, as determined by a unique algorithm in the PDE.

When a user makes a content transition, a state transition event is registered as described in each respective SSM. An action-based transition is any explicit TV control button pressed; e.g., a channel change, or volume increase. A non-action event occurs when content changes with no explicit user action; e.g., new program on same channel. In the latter case, a new program event causes a self transition on any other state that stayed the same, i.e., a steady channel is a channel state self transition. Another possible case is no channel change, but the same liked program title repeats itself. In this case, all SSMs will have a self-transition in their last state. Importantly, self-transition to programs that are short enough to be otherwise counted as surfing, are counted as non-surfing transition. This choice follows the philosophy of heuristically modeling the users behavioral intent.

Figure 5:
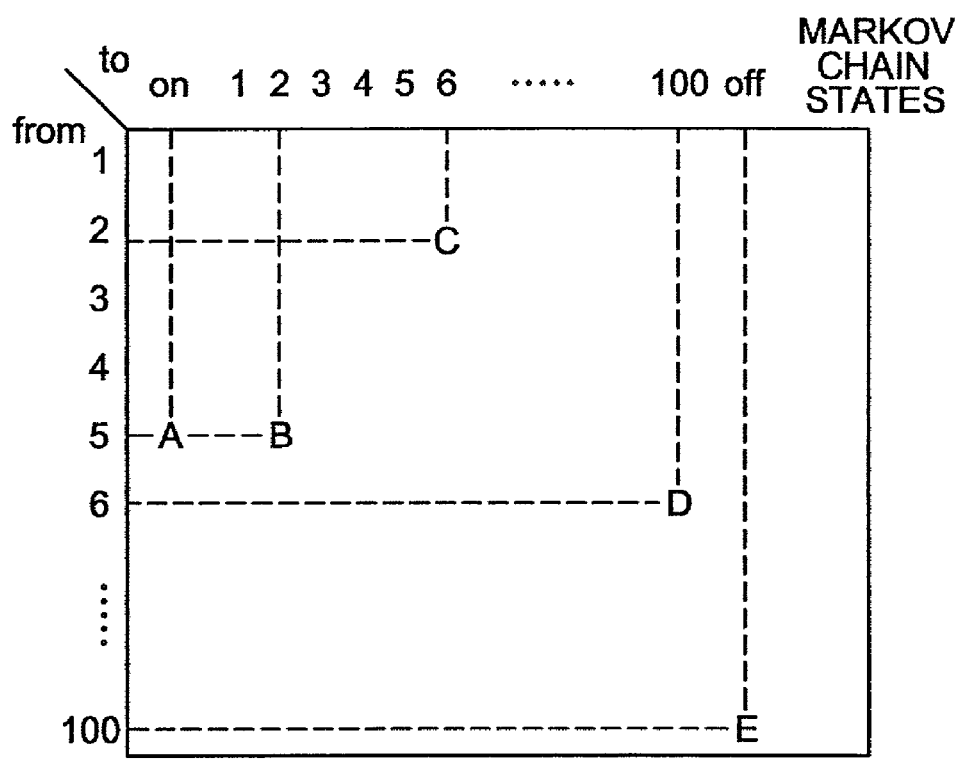
FIG. 5 is a diagram of an exemplary channel transition matrix representing a state machine.

FIG. 5 details a representative state space SSM matrix, of FIG. 4, and its operation. The rows represent the 'from' state, and columns the 'to' state of a state transition. The process may be referred to as a dynamic demographic cluster knowledge base in terms of transition matrix and weight set (TNWS)

The transition matrix, in principle, describes the viewers' behavior in a kind of temporal form. The transition matrix illustrated in FIG. 5 is a channel transition matrix. The dimension of the matrix is A×A. A is the number of channels available plus 2.

The number of different types of matrices is 2, one is for channel—as shown in FIG. 5—one is for genre.

There are two sets of matrices for each day of the week for every demographic group, i.e. there exist 14 matrices for channel group i (i=1, 2, 3 ... N; N the number of groups). One set for watching activities, another for surfing.

The matrix in FIG. 5 shows the following transitions: On→Ch.5→Ch.2→Ch.6→Ch.100→Off. An item in the matrix (A, B, C, D, E) is the median of all WatchedDuration/ProgramDuration of the demographic group for the action, e.g. transition from channel 5 to channel 2. Items in the on-column and off-column and those matrix for surfing are counts for the action.

Based on the transition matrix it is possible to predict a demographic group. After building the transition matrix, weight sets have to be optimized for all demographic groups. The optimization is based on maximum entropy theory and reinforcement learning.

On the client side, the prediction is effected the same way unless there is a memory restriction. If that is the case, entropy evaluation will be used to eliminate those columns which are less important. The weighting items discussed later are optimized and fixed for the client to use. However, if the client has more computation power than it can consume, it can optimize those weight sets and keep them locally.

By way of example, we take a watched channel transition matrix $H_{C_{ij}}$ where i is a channel; j a group, is the entropy of a to channel, i.e., a column, in a channel transition matrix. Note that the lower the entropy is, the higher value of information content the column has. A lower $H_{C_{ij}}$ means that there exists a valuable to transfers value for this channel. Ideally, $H_{C_{ij}}$, i=1, 2, 3 ... N, j=1, 2, ... M, N the number of channels and M the number of groups, are different for groups, which means that the transition matrix will help to identify viewers' demographic group.

The final goal is to obtain a probability $P_j$ for a viewer, then picks up $$\frac{\max P_j}{j}$$

as j the predicted group for the viewer.

The probability $P_j$ can be derived from two sets of transition matrix with the transition matrix of the viewer as follows:

First, calculate $H_{X_{ij}}$ where X are channel and genre, also for both watching and surfing, i.e. X takes 4 values.

Calculate $N_{X_{ij}}$ which is the entropy of from, i.e. the rows.

Then, calculate the probability distribution for both columns and rows $$P_{H_{X_j}}(a_{i,j})\ a_{i,j} = \frac{1}{H_{X_{i,j}}} \text{ and}$$

$$P_{N_{X_j}}(b_{i,j})\ b_{i,j} = \frac{1}{N_{X_{i,j}}}$$

Next, create a weight matrix $W_{H_j}$ of every transition matrix for all groups. The items $w_{x,y}$ in the matrix are $$w_{x,y} = \frac{w^1_{x,y}}{\sum_{x,y} w^1_{x,y}}; \quad w^1_{x,y} = P_{H_j}(a_{x,y}) * P_{N_j}(a_{x,y})$$

where $w_{x,y}$ is the weight for one transition action.

Now, calculate a weighted item distance between knowledge base and viewers' transition matrix $$D^L_j = \sum_{x,y} |L^k_{x,y} - L^P_{x,y}| w^L_{x,y}$$

where L is one of the transition matrices. The terms $L^K$ and $L^P$ are L matrices for knowledge base and viewer respectively.

Finally, reinforcement learning should be utilized, e.g. Monte Carlo type, to optimize $W^L_j$ for the best result. A good result is that the viewer's group is predicted correctly.

$$P_j = \sum_L^M D^L_j * W^L_j \quad \sum_L W^L_j = 1$$

There are two types of receiver with which the system can operate, one with feedback channel, one without. The optional feedback channel is indicated as a dashed line in FIG. 1. If a receiver with feedback channel provides demographic information, the task of demographic group based advertisement is quite straightforward, as will be described in the following. Also, the performance of the advertisement is easy to measure. If the receiver does not provide demographic information of the viewers, it will be treated the same way as a receiver without feedback channel, apart from the way of gathering the performance which can be obtained by the feedback channel directly.

For receivers without the feedback channel, two methods are provided for determining viewers' demographic group. Which one to use depends on closer match principle of the two, which is measured by maximum entropy measure on $P_j$ of the above discussion. The method which produces smaller entropy value should be used. The performance of those receivers without feedback channel should be measured by market research, then put into the learning circle as those with feedback channels.

The realtime feedback of viewer's action with demographic and performance info, of course, exists only when a back channel exists for a viewer's receiver. It contains information of the viewer's behavior information stream and the performance of the demographic prediction. The behavior stream should contain at least the items listed above, namely, watch_date, watch_start_time, watch_duration, watch_channel, and demographic information. The performance is a temporal list to indicate whether the receiver's prediction is right or not.

Since the demographic information of the receivers are known, the knowledge base acquirer (see central box in FIG. 1) can make changes based on the feedback information.

In summary, therefore, FIG. 5 is a representative non-temporal state space SSM matrix, and its operation. The exemplary channel state space uses the transition from OFF to channels 5, 2, 6, and 100, and back to the OFF state starting from an empty matrix. The ProfAgent increments the appropriate transition matrix entry for each state pair. For the present example, the following (from,to) matrix entries would be incremented (5,on), (5,2), (2,6), (6,100), and (100, off). The number of times visiting channel 5, is the sum of all of the entries in column 5 (, the global probability is that number divided by the matrix totals. Once on channel 5, the probability to go to channel 2 is the counts of (5,3) divided by the sum of row 5 (channel 5 from states).

A similar process governs the accumulation and analysis of higher dimensional transition matrices such as temporal. The mechanism is identical, except the entry in the appropriate time interval plane of the transition is incremented. An important difference between the pseudo HMM implementation, and the theoretical HMM is that the state transitions in the Markov chain are not necessarily independent of the last state. Thus, the probability to traverse through a state sequence is not necessarily equal to the product of the individual state transition probabilities. It is a lower bound, however. To the extent the user state selection behavior is uniformly random, the pHMM converges towards the theoretical HMM. The lack of transition independence does not extinguish the utility of a partial random state machine model as user selection behavior tends to be Gaussian, however, it does require additional statistical information to compensate. Sequence modeling, as described herein, is such an attempt.

The preference determination and the profile modeling described in the foregoing may be applied in a variety of contexts. Here, we concentrate on the targeting of advertising content based on the preference ratings and profile modeling.

Figure 6:
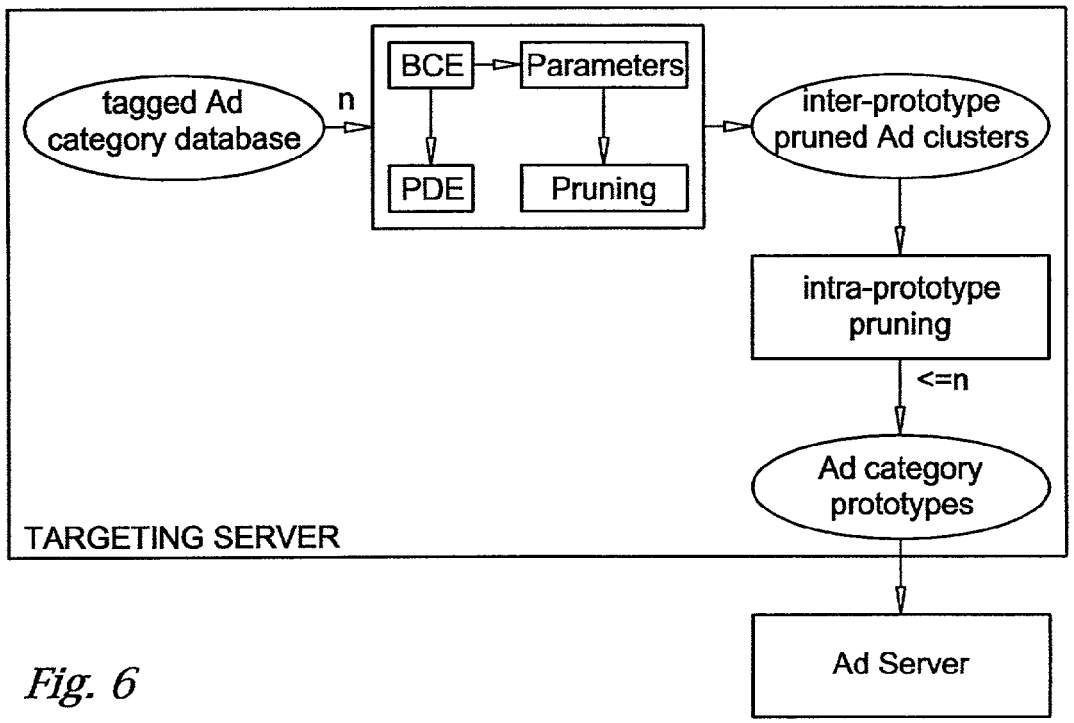
FIG. 6 is a block diagram of a targeting server representing an advertising category, behavioral prototype learning system.

FIG. 6 illustrates the advertising category, cluster learning architecture that is applied in the targeting server. The BCE creates m-clusters from m users from a particular advertising category training set. The Cluster Aggregator block extracts the most representative aspects of the learned clusters and creates a typical profile of the group. After training over n Ad categories, n typical advertising category behavioral profiles are created. That is, FIG. 6 depicts an advertising category, behavioral prototype learning system, i.e., the top level advertising category, cluster learning architecture. The module resides at the head-end Ad Manager, inside the targeting server. Cluster learning is a continual process of defining and optimizing advertising category groups (clusters), and their correlated behavioral profiles based on high quality tagged and sampled TV user logged data. The demographic, behavioral data are either input from a third party, and/or field deployed units. A selection filter extracts the targeted advertising category at the training set for the BCE. The BCE processes each user record in the training set as if they were from the same user, thus creating a very large aggregate BM. The resulting BM is parameterized, and pruned to a subset of only highly biased dimensions that serve as the representative behavioral signature for the advertising category. This step is referred to as inter-prototype pruning, since it only removes bad, insufficiently biased, dimensions within a given BM. The BCE repeats this procedure for each training cluster, until every advertising category group has a corresponding behavioral signature profile, if one exists. A typical advertising category profile will exist if, and only if, there is at least one behavioral dimension significantly biased over random. Each SSM has a corresponding set of novel parameterizations of generic, characteristic state transition behaviors that tend to separate users.

Figure 7:
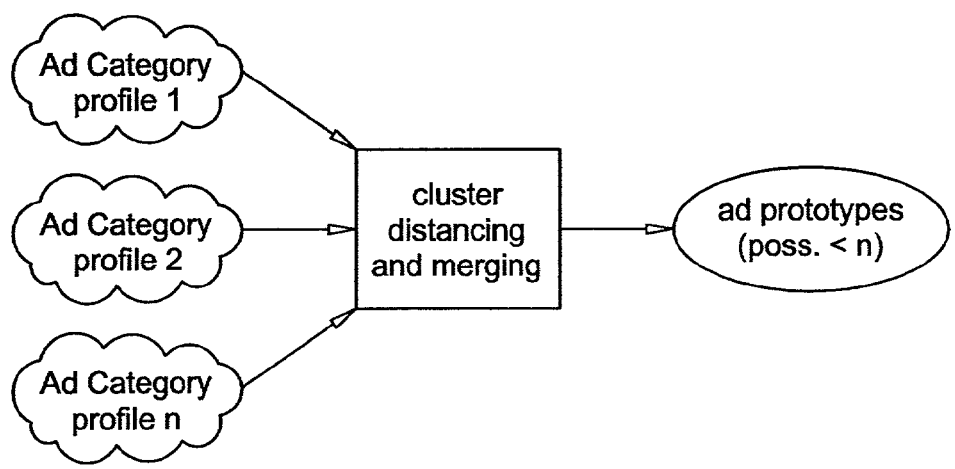
FIG. 7 is a block diagram expanding on the intra-profile pruning in the cluster aggregator section of the targeting server of FIG. 6.

FIG. 7 depicts the pruning phase of advertising category template building. This phase distances the prototypes by removing the dimensions most in common dimensions among the categories. The second stage, herein called intra-prototype pruning or intra-profile pruning, of advertising category behavioral prototype building removes dimensions in each BM that are similar to all other corresponding BM dimensions. This step selects the most distinctive dimensions across all targeting reference profiles, hence creating a minimal description length for each advertising category prototype. If the result of this pruning process is to remove all, or significantly all, of a prototype's classification dimensions, then the most similar Ad categories are merged into a single predictive class, thus diminishing the best targeting resolution of the system to the merged Ad categories. For example, if insufficient dimensional distance separates three male age groups in their 20's, 30' and 40's, then these Ad classes are merged into a single class of males between 20 and 40 years old. The targeting server sends the final targeting Ad profile prototypes, their category labels, and expected prediction performance to the Ad Server.

The detailed aspects of the novel training, pruning, and merging process follow. The BCE begins the training process by building the BM with labeled user data from the selected targeting group members. The BCE calculates transition and certain behavioral patterns from each user action. Transition counting events supported by the BM include changes in any program EPG entries, occurring at various relative time measures. A minimal event training log appears as:

<user ID><date><time><channel><genre><title> <program length>

Since the training set is a preexisting database, learning occurs in batch mode, instead of real-time. In batch mode, all viewed programs within a certain learning window, are rated and sorted at once. The BM simulation steps the learning window over the user data, or learning period. With real-time data, a temporary holding area is necessary while building sufficient evidence to include the transition into a statistical state machine SSM. The learning window determines the temporal performance of the system. On the server side, there is generally no memory limitation, thus no need to delete possibly less preferred states to include new observations. The main effect of the learning window is to estimate the client-side BM performance over a range of memory limited user history periods. A goal of the present invention is to identify stationary behavioral parameters, and their typical variance. When the probability density function for the random variable is a function of time, the random process is said to be non-stationary. To determine the statistical stability period for the group non-stationary random process behavior, the learning window is continuously adjusted from a few days, to a few months. The approximate stationary period is the learning window size that has the best correlation between window steps. Every advertising category potentially has a different average stationary period. For example, senior citizens may have more repeatable behavior, for a wider interval of time than teenagers. The targeting server provides the Ad server with the expected learning times needed to approach prediction stability, and convergence for each advertising category.

Figure 8:
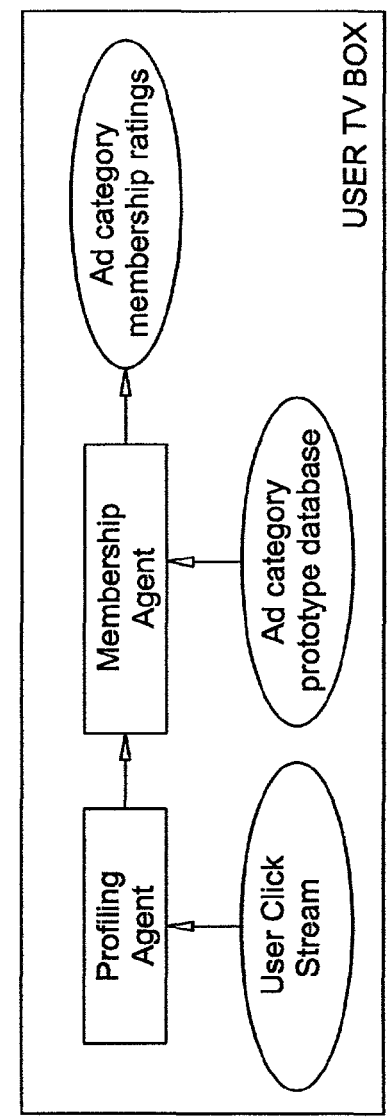
FIG. 8 is a block diagram of a client-side advertising category classification system.

FIG. 8 diagrams the real-time advertising category estimation system. The MemberAgent compares the real-time TV user's usage behavior to the advertising category templates and calculates a probability distribution of the user's advertising category.

Figure 9:
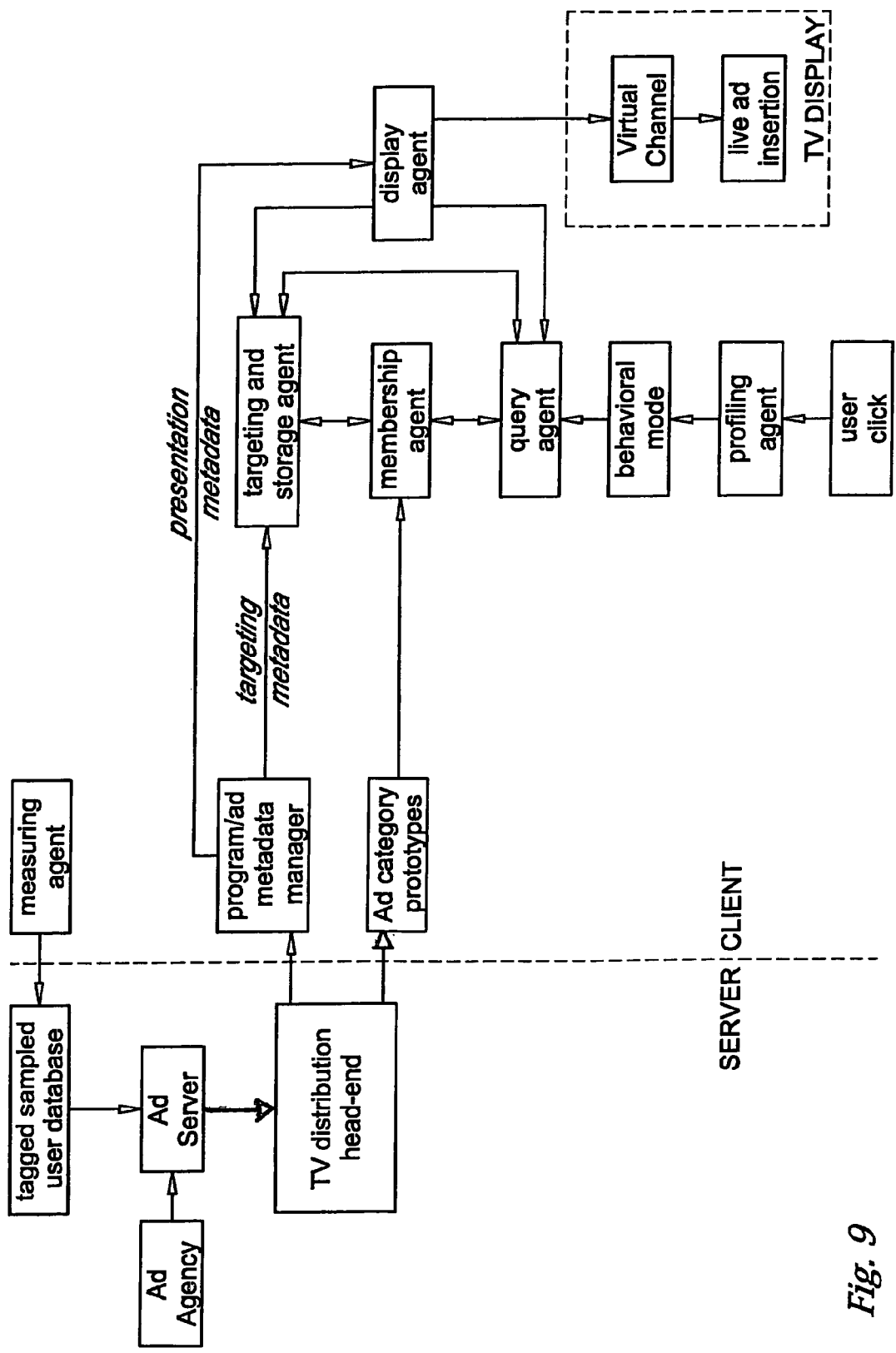
FIG. 9 is a block diagram of an ad targeting system showing the server side and the client side.

FIG. 9 outlines the TV Ad targeting system according to the preferred embodiment. The TASAgent receives Ads from the TV head-end, and interprets the Ads targeting metadata. The TASAgent compares the target audience, specified by the Ad's targeting query expression, against items selected from the household users advertising category predictions data, and produces a targeting rating that the TASAgent, and PresAgent use to determine which Ads should be stored, and displayed respectively.

Referring now to FIG. 10, there is illustrated the preference determination engine architecture according to the invention. The profiling agent (ProfAgent) incrementally updates the behavioral model BM with each content change event. Initially, the event is decomposed into its states, if any, and temporal relationships. Liked states are any modeled aspects, characteristics or usage, associated with a liked program. The ProfAgent receives program preference ratings from the preference determination engine (PDE). The PDE determines a liked program by evaluating the voting network in FIG. 10. There are three main components to the PDE, real-time content and context preference learning (ProfAgent), preference prediction (PredictAgent), and a BMQagent. A description of the PredictAgent follows the ProfAgent overview. The output is a perception-like weighted linear, fuzzy voting, combination of the previously enumerated preference sensing filters (PSF):

The ProfAgent Learning Algorithm
Initialization
1. Set all n weights equal to 1/n
2. Set $\rho$, $\delta$, and $\eta$ to conservative estimates (e.g., $\rho_p = \rho_n = 0$, $\eta_p = 0.1$, $\eta_n = \delta = 0.05$)
    Where $\rho$ is a trial dependent learning momentum term. $\eta$ is a trial independent learning rate. The n and p subscripts correspond to a negative and positive event, respectively.

Calculation of Output Activation O
3. $O = \Sigma W_j * V_j$, for all i=1 to n
    Where $V_i$ is the PSF fuzzy output vote.

Weight Training
4. For each positive event:

$w_i(t+1) = w_i(t) + \eta_p w_i(t)$, for all $V_i \geq \theta$ $w_i(t+1) = w_i(t) - \eta_p w_i(t)$, for all $V_i < \theta$ 5. For each negative event:

$w_i(t+1) = w_i(t) - \eta_n w_i(t)$, for all $V_i \geq \theta$ $w_i(t+1) = w_i(t) + \eta_n w_i(t)$, for all $V_i < \theta$ $\theta$ is the minimum fuzzy liking vote threshold.

Update learning rate
6. If positive event:

$\rho_P(t+1) = \rho_p(t) + \rho_p(t) * (O(t) - O(t-1)/\text{MAX\_VOTE})$ $\eta_p(t+1) = \eta_p(t) + \eta_p(t) * \rho_p(t+1) + \delta$ $\eta_n(t+1) = \eta_n(t) - \eta_n(t) * \rho_p(t+1) - \delta$ 7. If a negative event:

$\rho_n(t+1) = \rho_n(t) + \rho_n(t) * (O(t-1) - O(t)/\text{MAX\_VOTE})$ $\eta_n(t+1) = \eta_p(t) + \eta_n(t) * \rho_n(t+1) + \delta$ $\eta_n(t+1) = \eta_p(t) - \eta_p(t) * \rho_n(t+1) - \delta$ $\delta$ is a frequency reinforcing term The ProAgent adjusts weights of the single layer, n node network according to a reinforced learning scheme. The n weights, preferably user specific, are initialized equally to 1/n; i.e., all PSFs have an equal vote. Each time the user visits the same program, the training regime reinforces nodes that vote the program as liked, and penalizes the rest. This philosophy confirms preference predictions with observational frequency. To encourage stability and convergence, a learning rate η applies an incremental reinforcement signal to adjust weights.

Two learning rates govern the training process, a negative ($\eta_n$) and positive ($\eta_p$) event rate. A positive event is when the user selects the program, and a negative event is when a program was available in a previously liked context, but another program was chosen. In practice, there is more causal information in positive examples, than negative ones. Hence, the $\eta_p$ is normally much higher than $\eta_n$. The momentum term $\rho_p$ ($\rho_n$) increases (decreases) training rewards when the preference voting output indicates an increasing (decreasing) preference trend between positive (negative) events, and lowers $\eta_n$ ($\eta_p$) to reflect a positive (negative) learning bias. The δ learning rate term reinforces program visitation frequency. The reinforcement is positive for each positive event, and negative otherwise. Over time, the present preference learning system automatically learns the PSFs that best predict program preference, and de-emphasize the rest. The learning rates are adjusted to approximate the time constant of user periodic preference shifts. All PSFs output a fuzzy preference rating range in steps from a minimum rating value(e.g., HATES_PROGRAM=1), to a maximum (e.g., TOP_PROGRAM=MAX_VOTE=6).

θ is the value of the minimum fuzzy membership that indicates at least a program liking (e.g., $V_i$=LIKES_PROGRAM/MAX_VOTE=⅔=0.66). PSF reinforcement is determined by comparing a PSF's vote to θ. A vote is positive when $V_i \geq \theta$, and is negative otherwise. The effect is to reward a PSF voting weight if it voted positive (negative) during a positive (negative) program viewing event, and penalize it otherwise.

The PDE calculates the program, or any state type, preference rating, R, as follows:

If the program is already a state in a SSM:

$$R = \frac{(1+\lambda(t))}{t-q} \sum_{k=t-q}^{t} c_k O_k \qquad (1)$$

$O_k$ is the chronologically ordered array of preference votes for the program t is the number of recent ratings for the program, t points to current vote O.

q is the number of past ratings to include in the moving average c is a temporal weighting coefficient array, where $c_k <= 1$ λ(t) is a trial independent, but frequency dependant biasing term, where λ(t)<=1

If the program is not already a state in a SSM
R=O

The preference rating R of a program is a weighted moving average of the current and past program preference votes. A system designer skilled in the art sets the $c_k$ distribution to the desired temporal bias of past ratings. Typically, time diminishes the value of past information, hence ratings decrease in value over time. λ(t) proportionately increases the overall rating according to the number of times the program has been rated. λ(t) is preferably a small and slow growing function of viewing frequency; e.g., λ(t)=c*log(t)=[0.03 0.05 0.1 0.12 ... 0.15 ... ]. The effect of λ(t) is to indicate greater preference for a program the more times it is watched, independent of the PSF votes.

For example, if a viewer always watches only the first 20 minutes of the Tonight Show, the program's rating would be low, however the frequency term λ(t) would increasingly raise, say logarithmically, the rating to reflect the consistency of viewing preference; e.g., a 3% higher rating after 3 times, and 12% after 5 viewings, etc. All state types related to a program inherit the program's effective preference vote, O.

For example, if the program has a LIKED rating, then its genre, channel, actor, etc. likewise receive a LIKED rating. The PDE calculates a state candidate's preference rating, R, as described for the Title example above, shown in Equation (1). For example, if a user watched two comedy series, 'Seinfeld' with a LIKED rating, and then a good while later the user watched 'Friends' with an INTERESTED rating, then $O_1$=LIKED=4, and $O_2$=INTERESTED=3, then the comedy_series state preference rating is (with $c_1$=0.9, $c_2$=1, λ(2)= 0.03):

$$R = \frac{(1+\lambda(2))}{2}(c_1 O_1 + c_2 O_2) = \frac{1.03(.9*4 + 1*3)}{2} = 3.4$$

In this case, since there was a long time in between program viewing events, the older vote was reduced by 10%. However, since the same genre was viewed twice, the rating received a 3% increase. The same preference rating algorithm applies to any state type.

For each program viewed, the PDE passes a candidate state preference rating to the ProfAgent to update the BM according to the prescribed algorithms. The PDE directs the BCE to process all user training data, as if from one user, thus creating a single BM including behavioral information for all class members.

The voting output of the ProfAgent is stored in a voting history database (VOTEdbase), that the ProfAgent uses, as described herein, to determine the most preferred states to keep in the BMdbase. The PredictAgent also uses the VOTEdbase when responding to requests by the Preference Determination Agent PrefAgent for rating content parameter preferences. The PrefAgent and its function is described in the commonly assigned, copending patent application Ser. No. 09/893,192 (filed on Jun. 27, 2001) which is based on provisional applications 60/215,450 and 60/226,437. The disclosure of the co-pending application is herewith incorporated by reference.

A recording manager causes the recording of programs by periodically initiating a recording sequence. For that purpose, the recording manager sends a request to the preference agent PrefAgent for ratings of all programs at a particular time (X), or alternatively, for ratings of all programs within a particular time period (X). In certain embodiments, the frequency with which the steps are performed may be changeable by the user. The preference agent responds by providing ratings, from a preference database, for each program received from the recording manager. The recording manager then causes recordation of the programs at time X, or within time period X in accordance with the ratings received from the preference agent.

The preference agent monitors the viewing selection of the various viewers using the control system and creates viewing profiles of each viewer that are stored in the preference database. Based upon these profiles, the preference agent sorts through the incoming programming content as described in the EPG information to compile lists such as "Top 10" lists of viewing choices available at any given time to each viewer, and directs the recording manager to record the top-ranked program being broadcast at any given time (including any programs selected by the viewers for recording) and store it in a stored programs memory device. The preference agent further contains software that allows it to create a demographic profile for each viewer, based upon the viewing profile of the viewer and certain algorithms or associative rules. These algorithms may be adjusted over time as the model employed by the system administrator is enhanced and its accuracy improves. To this end, the system update information channel included in the broadcast signal may include periodic software updates, including new preference database parameters that may need to be included at the request of the advertising suppliers. Thus, in one embodiment the control system may be remotely upgraded to meet any new demands that may arise as advertising content providers become familiar with the system and the process of custom tailoring narrowly focused, targeted advertisements. The demographic profile created for each viewer is stored in a demographic database, which resides in the control system and thus ensures the viewers' privacy.

The preference agent also sorts through the advertising content streaming in through multiple advertising channels contained within the broadcast signal and, based upon the demographic profiles of the viewers and the meta data contained in each advertisement to describe the target audience for the particular advertisement, stores and/or causes the display of particular advertisements. The control system may utilize any of a variety of methods to manipulate the advertising content, as described below.

The PredictAgent combines preference voting history information with contextual BM preferences to produce a rating that the TASAgent, and other system modules, use to make preference-related decisions.

PredictAgent aggregates historic votes to produce an overall rating for the modeled state. PredictAgent has the same learning architecture as ProfAgent. Unlike the ProfAgent, however, that learns feature to feature contribution metrics, PredictAgent learns the optimal instance to instance statistical parameters. Instead of PSF inputs, there are three voting history statistical inputs: sample count, sample max, and sample min, and their respective voting weights as follows:

CntPctCoef, weight for the number of times the state was visited
 MaxPctCoef, weight for the maximum vote ever observed
 MinPctCoef, weight for the minimum vote ever observed
The following is the pseudo code for the preference rating calculation, in the exemplary title state case:
 validStates=find(cntLTitleVote);
 TeffMinVote=avgLTitleVote-sdvLTitleVote;
 maxTcnt=max(cntLTitleVote(validStates));
 maxTmax=max(maxLTitleVote(validStates));
 TcntAdj=log(cntLTitleVote(validStates))/log(maxTcnt)−log(mean(cntLTitleVote(validStates)))/log(maxTcnt);
 TmaxAdj=log(maxLTitleVote(validStates))/log(maxTmax)−log(mean(maxLTitleVote(validStates)))/log(maxTmax);
 TminAdj=(minLTitleVote(validStates)−mean(minLTitleVote(validStates)))/MAxTITLeVOTE;
 TeffVote=TeffMinVote+TeffMinVote.*(TcntAdj*cntPctCoef+TmaxAdj*maxPctCoef+TminAdj*minPctCoef);

The votes are assumed to have a Gaussian distribution, and a conservative rating is desired. TeffMinVote is the average vote reduced by the standard deviation of all votes. This is a voting cluster classification cut-off. MaxTcnt, and maxTmax are normalizing maximums over all state visitation counts, and highest max vote. Learned adjustment factors bias TeffMinVote according to the learned adjustments TcntAdj, TmaxAdj, and TminAdj. These vote adjustment parameters range from zero to one, and grow logarithmically with stimulus, and are further normalized by their respective average value. Such a rating policy favors consistently high observed ratings over unstable preference ratings that may average high. The state count adjustment factor gives a positive (negative) bias to more (less) frequently watched states. Thus, a one event high preference vote for an action movie, could score lower than a daily average vote for a comedy:series. This equation term helps overcomes the case where the preference rating is, for some reason, inaccurately low, but the user repeated behavior warrants a higher vote. The TmaxAdj term helps make the preference rating meaningful relative to the users preference range. That is, if a user has never demonstrated a very high rating, possibly due to poor system performance, ratings that approach the user's personal maximum, should be bias upward to indicate a relatively high score for this user. This is especially useful when comparing ratings between users in a multi-user ID case, for example. The TminAdj vote activation level biasing term favors state votes that deviate significantly above the average minimum vote over all related states. This is a soft greedy vote skewing strategy that uses the users lowest responses as a reference point to infer high confidence in higher relative ratings.

The PDE uses the PredictAgent's global adjusted preference ratings to determine the states to replace with more preferred states, when a maximum state count is reached due to memory limitations, if any. Hence, the BM is continually updated to contain the most relevant states (potentially all visited states if memory permits).

Figure 11:
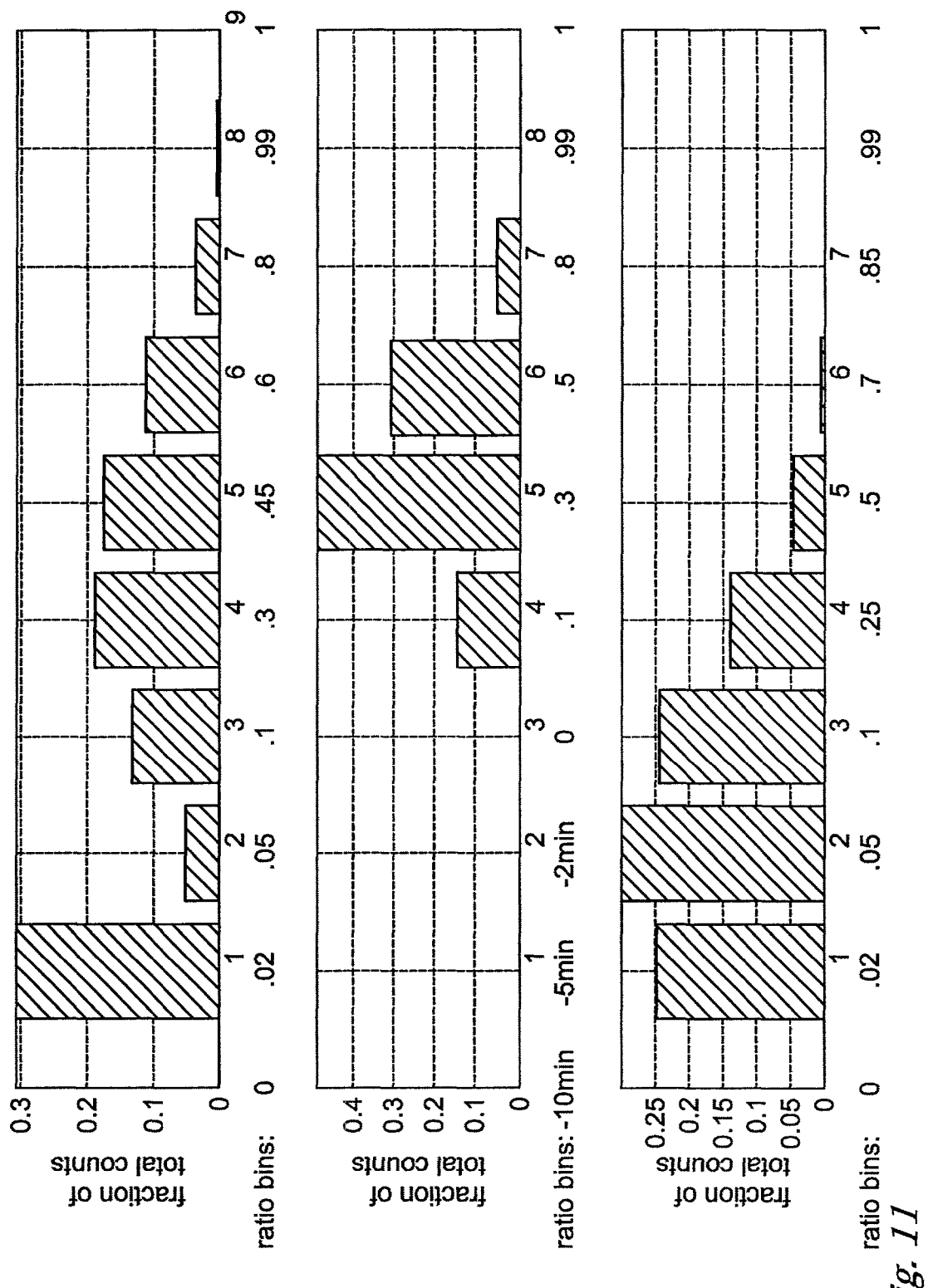
FIG. 11 shows three graphs recording various non-surf program watching ratios (with 1657 user inputs)
Figure 12:
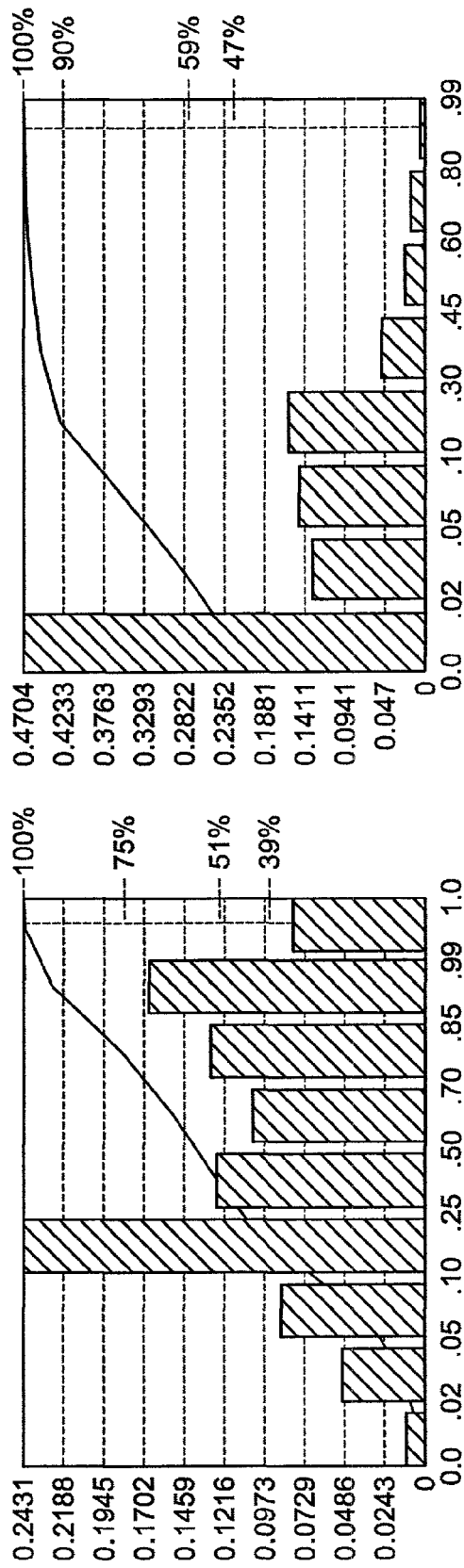
FIG. 12 are four graphs recording hopping behavior statistics for 1657 users.
Figure 12:
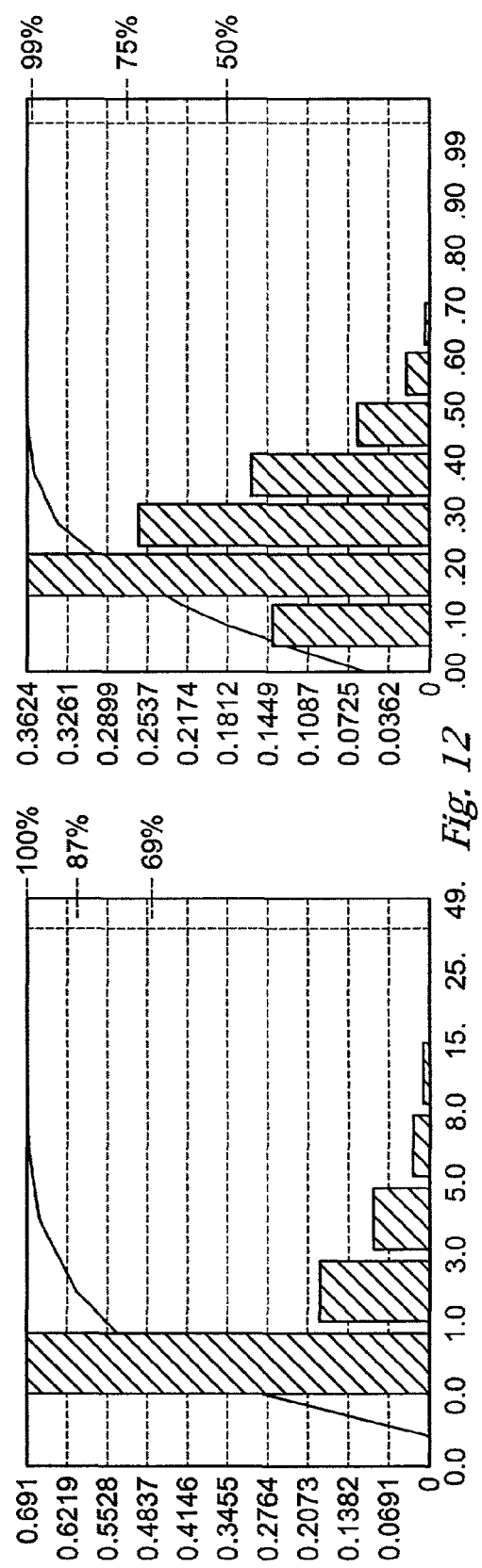
Figure 12A:
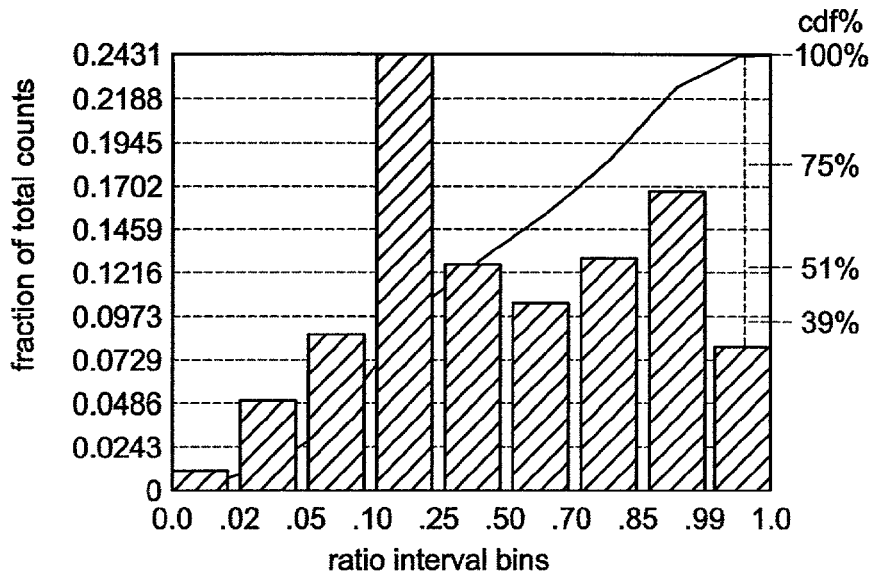
Figure 12A:
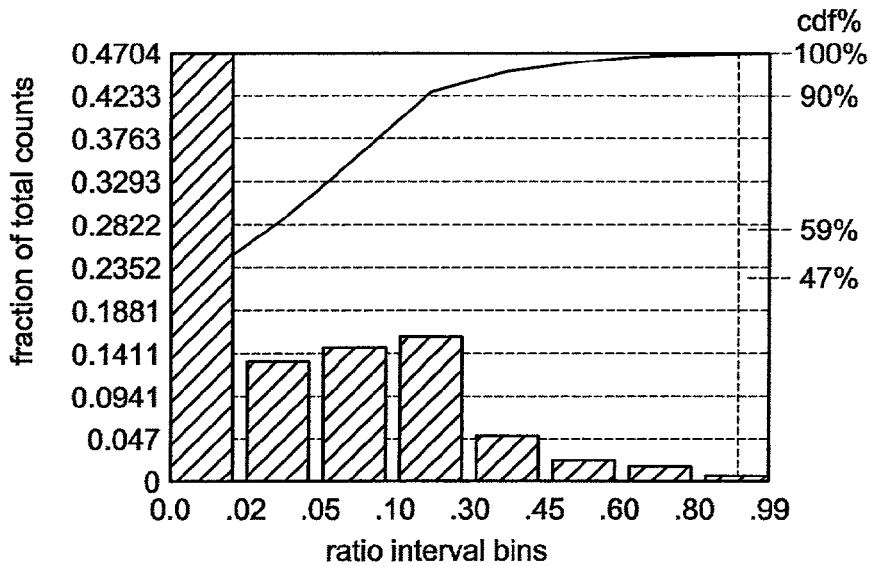
Figure 12B:
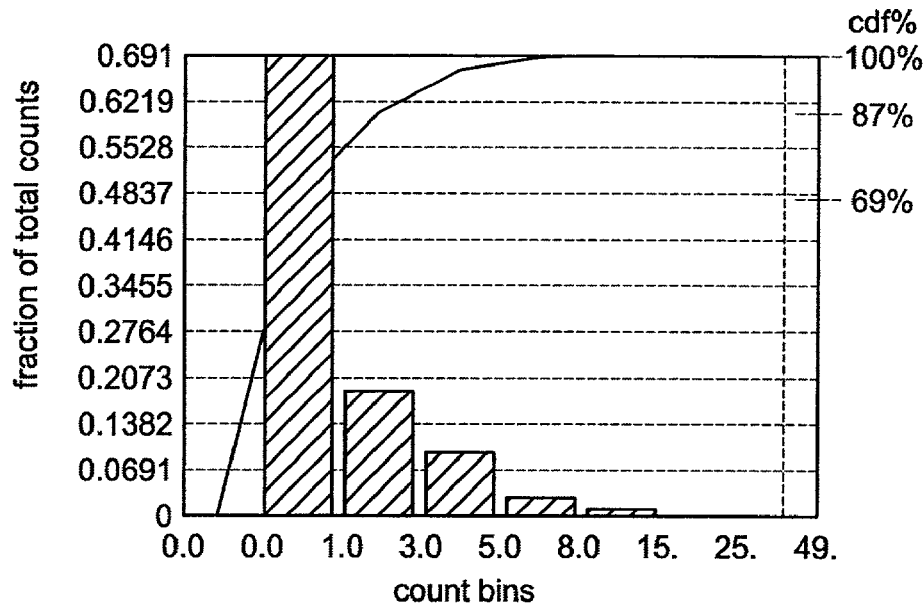
Figure 12B:
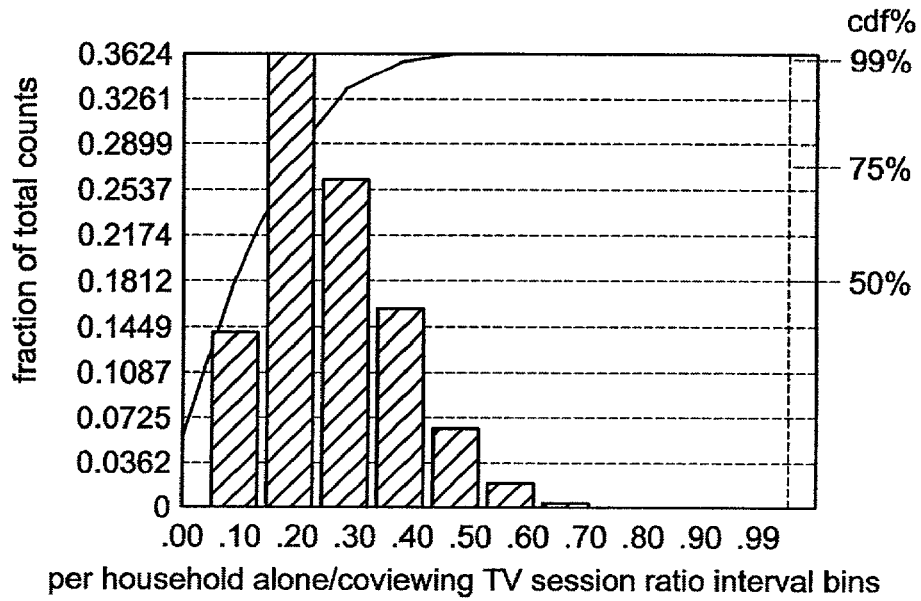
Figure 14:
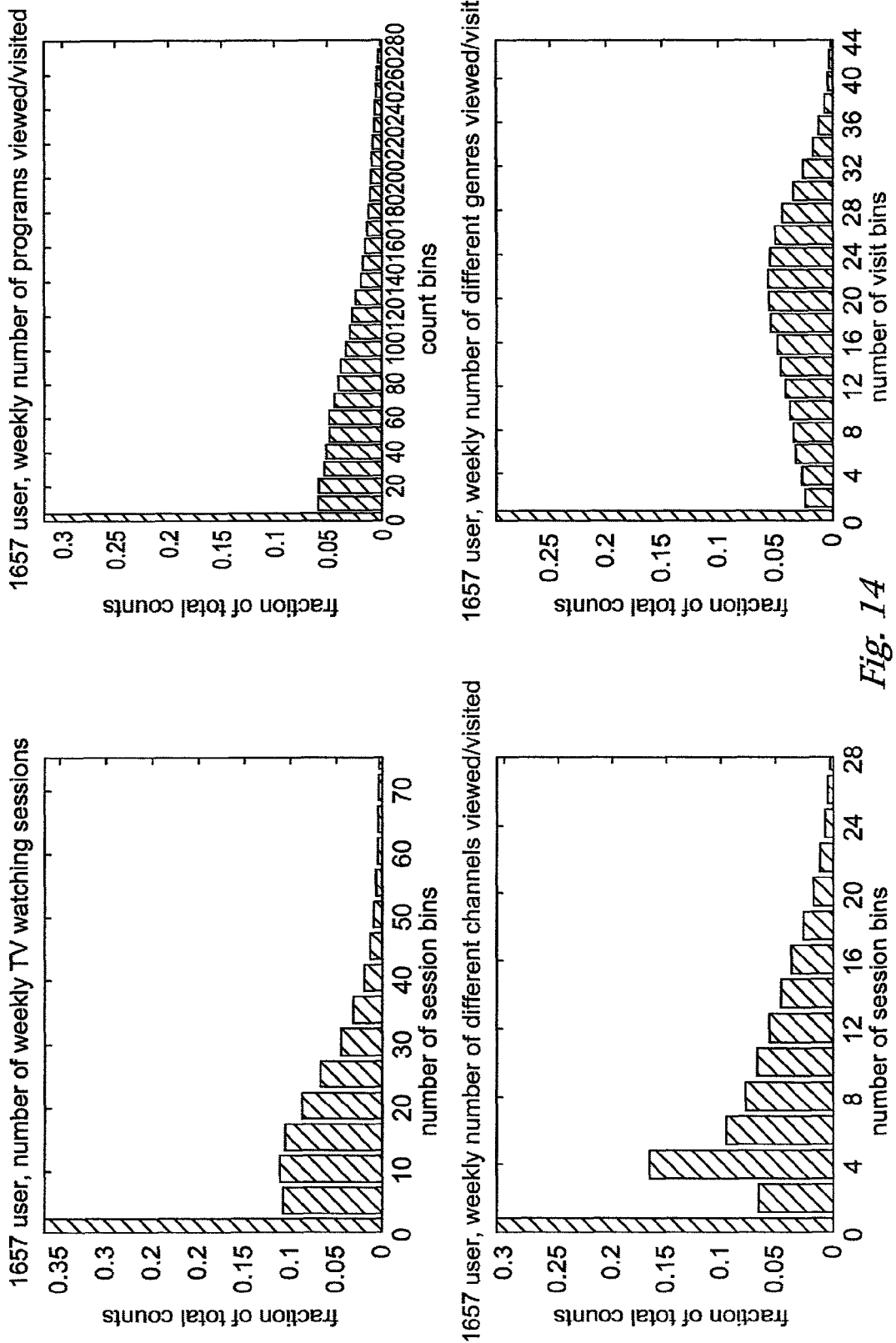
FIG. 14 are four graphs with typical user behavioral statistical distributions with weekly recording of 1657 users.
Figure 15:
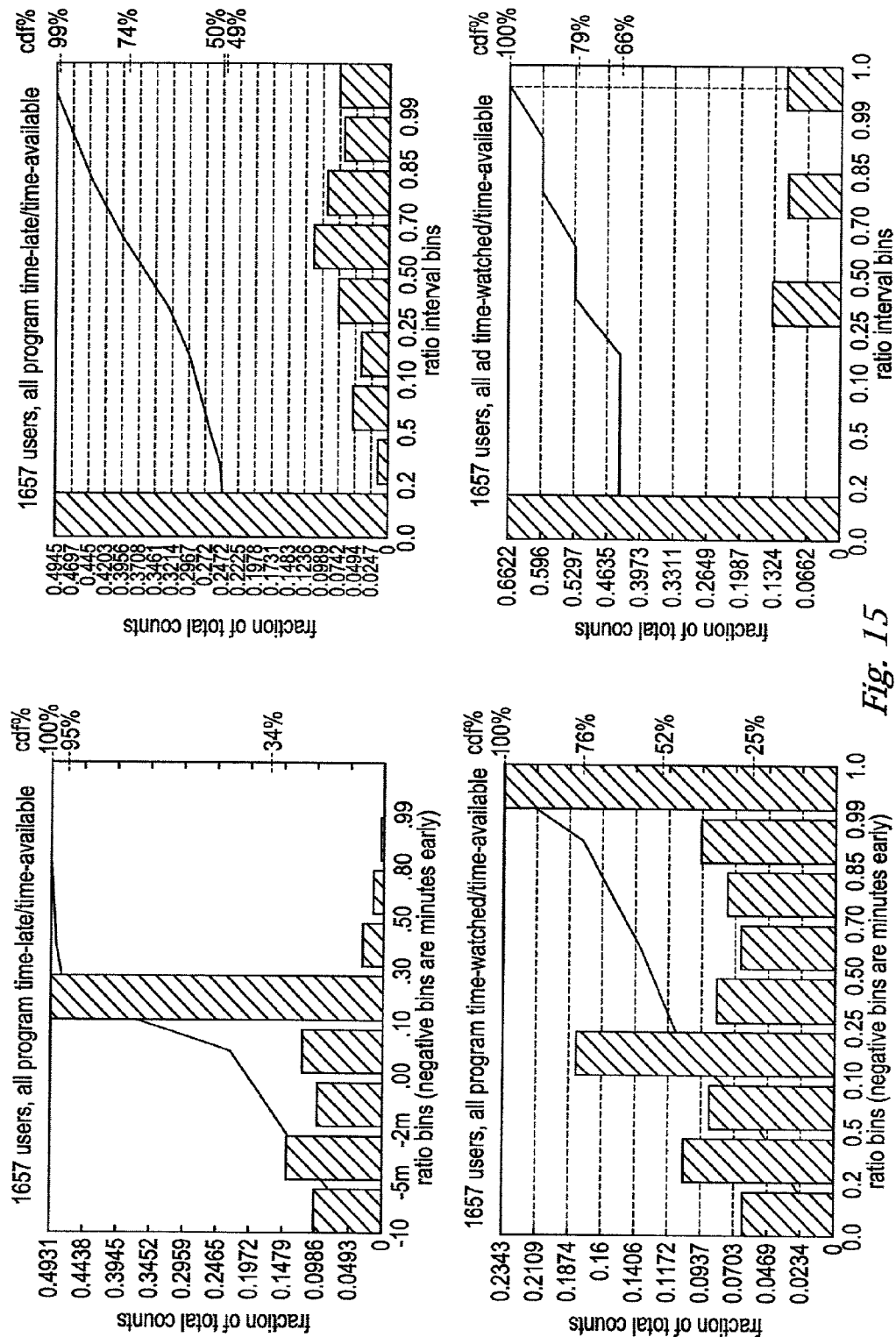
FIG. 15 are four graphs illustrating various additional parameter distributions for the exemplary 1657 users.

The next step of the advertising category, prototype building process is to parameterize the BM into a pseudo Euclidean space. Since modeling data structures in the BM are not one-dimensional Gaussian distributions, determining distance between two BMs is a difficult, and inaccurate procedure when using prior art techniques. Prior art techniques assume sampled data has a bell curve shape distribution, and model the data as Gaussian, defined by a mean, $\mu$, and variance, $\sigma$. However, as shown in FIGS. 11, 13, and 14, samples in various modeled categories are not normally distributed, but exponential, beta, uniform, delta, or multi-modal. Importantly, transition matrices do not lend themselves to standard distance metrics required to determine cluster membership. Known classification methods define a Euclidean feature space consisting of cluster neighborhoods centered at the cluster means, $\mu$, with cluster boundaries extending $\sigma$ from $\mu$. The Mahaloanobis distance is traditionally used to discriminate cluster membership. The Mahaloanobis distance is simply the Euclidean distance divided by each cluster's dimensional $\sigma$; or, $$(\mu_1 - \mu_2)^T \sum\nolimits^{-1} (\mu_1 - \mu_2),$$

where $\Sigma$ is the mutual covariance matrix

This method is very inaccurate, and impractical in TV systems. It is inaccurate for two primary reasons: it falsely assumes Gaussian sample data, and the inversion of the covariance matrix introduces significant floating point round off errors that often render the matrix singular. In high dimensional space, e.g. over 100, calculating and inverting a covariance matrix inversion can be prohibitive in CPU time, and memory. In a typically sparse sample matrix, many unnecessary cross correlation terms must be manipulated. Standard methods are similarly not applicable to determining the distance between corresponding SSMs. Thus there is a need for a novel strategy to represent multi-modal clusters and distances between them.

The BM is parameterized into three general classes of behavioral dimension data types: histogram, scalar, discrete. To represent SSMs in a classification space, general, instance independent, behavioral patterns are identified, and extracted as dimensional classification parameters. Each matrix parameter is a dimension in a pseudo-Euclidean classification space.

Some typical SSM parameter categories are:
1. Transition bias histogram
2. Self-transition bias histogram
3. Turn-on (off) state type bias histogram
4. Transition reversal bias histogram
5. Single transition ratio
6. SSM matrix sample confidence
7. Bias to top n states
8. Top n states Items 1 through 4 are distributions of observed bias for the corresponding behavioral patterns. Item 1 represents the amount of bias for transitions to occur over random. Another important behavioral category, item 2, is how likely are transitions back to the original state; i.e., going from a comedy to a comedy. Item 3 captures a user's expected session start or ending states, for all state types. Item 4 represents a distribution of bias levels to make a transition biased in one direction over another. Some scalar parameters include the ratio of single to all transitions, item 5, matrix non-random bias, item 6, and the bias to transition to the top SSM states.

The state sequence model, for all state types, has general parameterizations including: Sequence length histogram. Ratio of unique sequence states to all states visited. Fraction of liked states out of all sequence states visited. Sequence state focus. Maximum sequence length. Ratio of sequence transitions to all single transitions Classification dimensions related to the hopping behavior are preferably parameterized as follows: $T_w/T_a$ histogram. $\Delta t/T_a$, histogram of program fraction times between hops. $\Delta t$, histogram of times between hops, and a histogram of number of hops per program Finally, the system utilizes a variety of program-related feature dimensions. These dimensions include: $T_w$/trans, time watched per transition histogram. $T_w$/prog, time watched per program histogram. Ad $T_w/T_a$, advertisement time watched per time available histogram. $T_w$/session, time watched per TV session histogram. Viewed program start time of day. $T_m/T_a, T_w/T_a, T_l/T_a$ histograms. And, number of unique states visited per time period.

A detailed listing of parameterized dimensions used in the BCE need not be provided within the framework of this specification. Those of skill in the pertinent art will readily be enabled to establish the necessary parameter dimensions, including variations, parameterizations, and extrapolations.

The novel bias calculation algorithm determines the qualitative evidence for a non-uniformly random selection process; and hence, the likelihood for meaningful behavioral information. The expected uniformly random matrix bin coverage is calculated using the binomial distribution. Each user action is viewed as a pass-fail event to fill a given bin. The number of trials in the binomial experiments, or state transitions, is the number of transitions in the matrix. The probability of an event success, or filling a particular matrix bin, is the uniformly random probability that any bin is selected. The binomial probability for a given bin to be filled after a certain number of trials, translates to the number of bins in the matrix expected to be filled by a random process. Thus, the ratio of how many bins would be filled by a uniformly random process, to the actual number of bins filled, indicates a biased, or non-uniformly random, process behind state transition selections. The bias measure is additionally a quantitative indicator of a statistically significant sample size. If there are not enough samples in the matrix to infer a non-random SSM transition process, the bias measure is less than or equal to one. Prior art methods generally require $n^2$ samples in a n by n matrix to determine if the covariance matrix is expected to be statistically significant. This requirement is prohibitive as n gets large. For example, for a 30 by 30 matrix, traditional methods require 30×30, or 900 samples, which is impractical to obtain in a short period of user TV usage. The reason prior art has this constraint, is that they require enough information to infer confidence in all cross-correlation terms in the covariance matrix, since there is no a priori way to predict which are significant, even if the vast majority of these terms are zero. The present matrix bias detection method determines statistical significance continuously, and often converges on order n samples.

The following is a detailed computational description of the bias estimation technique, as applied to the Liked_Channels transition matrix.

The pseudo-code function definitions include the following:

sum(X)—sums the columns of matrix X, if X is an array sum elements to a scalar result.

length(X)—returns the greatest matrix dimension length of X.

find(X)—returns all non-zero elements of X.

X(1:5,1:5)—returns a sub-matrix X' that is rows 1 to 5, and columns 1 to 5 of X.

Y=binocdf(X,N,P) returns the binomial cumulative distribution function with parameters N and P at the values in X.

union(A,B)—when A and B are vectors returns the combined values from A and B but with no repetitions.

sqrt(X)—the square root of the elements of X sort(X)—sorts the elements of X in ascending order.

The following rules pertain to matrix uniform random calculations:

1. uniform probability to transition to a certain state from a certain state:

Ptrans_rand=1/(NUM_LIKEDCHAN_STATES−1);

2. uniform probability to choose any possible transition (do not count the TV OFF state):

state_Prob=1/sum(sum(LikedChanTransMtx(:NUM_LIKEDCHAN_STATES,2:NUM_LIKED CHAN_STATES)));

3. uniform probability to start or end users session in a certain state:

PonOffRand=1/(NUM_LIKEDCHAN_STATES−1);

4. bias vector to start in a certain state (stateOFFbias similar):

stateONbias=(LikedChanTransMtx(START_VIEWING,1:NUM_LIKEDCHAN_STATES)/ON_SESSIONS)/PonOffRand;

5. bias over random to start-up surfing:

ViewrLchOnSurfBias(viewer_idx)=stateONbias (SURFING);

6. bias over random to start-up in Unliked state:

ViewrChanOnUnlikeBias(viewer_idx)=stateONbias (UNLIKED);

Matrix sample concentration bias calculation follows these rules:

1. bias as a multiple over uniformly random for non-start-end state transitions:

bias_mtx=(LikedChanTransMtx(2:NUM_LIKED-
   CHAN_STATES, 2:NUM_LIKEDCHAN_
   STATES)/Num_trans)/Ptrans_rand;

2. number of unique transitions between non-start-end states visited by user:

numFilledBins=length(find(bias_mtx(:)));

3. number of unique transitions between non-start-end states possible:

numBins2Fill=length(bias_mtx)^2;

4. fraction of possible bins actually filled:

mtxFillRatio=numFilledBins/numBins2Fill;

5. binomial bin selection expectation given number of samples and uniformly random success ratio:

ExpCoverage=1−binocdf(minHitsPbin−1,Num_trans,
   1/numBins2Fill);

6. actual bin filling success ratio observed:

ActCoverage=numFilledBins/numBins2Fill

7. ViewrLchMtxConf(viewer_idx)=ExpCoverage/Act-Coverage

The matrix confidence ratio (MtxConf) indicates the likelihood of a non-random process bias. Thus, it tends to give the confidence that a sample set is large enough to infer it has a non-uniform-random origin. Increase the minimum hits, or successes, per bin (minHitsPbin) to increase confidence in an adequate minimum sample set size (typically, minHitsPbin=1 is practical). Inter-prototype, or local, dimensional pruning follows the BM parameterized step in the advertising category prototyping process. High variance or, similarly, low bias, dimensions are removed. The most representative classification features are those that have a tight sample distribution spread. Features with more uniformly spread data approach a uniformly random distribution, and are not as useful in cluster discrimination. A typical pruning cutoff is one standard deviation for Gaussian modeled scalar features ($\sigma_{cut}$), and a bias ($\beta_{cut}$) less than or equal to a uniformly random expected sampling spread, otherwise. The system designer achieves an increasingly strict pruning criterion by decreasing $\sigma_{cut}$, and increasing $\beta_{cut}$. Too strict a pruning policy, and valuable cluster separation information is lost, and could result in an empty prototype by removing all dimensions. Too relaxed a threshold results in loosing classification performance by including many non-predictive features. The product of the inter-prototype pruning phase is a preliminary advertising category template prototype. The preceding algorithms are applied to each training set, creating a locally pruned, possibly empty, reference profile for each.

After local prototype pruning, global, or intra-prototype, dimensional pruning further removes superfluous information. In this pruning stage, each advertising category prototype is compared to every other one, and dimensions that do not separate any of the clusters are removed. To measure cluster distances involving non-scalar, non-Gaussian dimensions, however, requires a novel method. Known methods define a sample point in a coherent, high dimensional space. However, the BM does not correlate, or preserve, feature values for each observation. Instead, all sample data dimensions register the observed feature values into their respective distribution modeling histograms, as if they occurred independent of time, and any other dimension. Thus, it is not possible to define clusters as sample points of the BM in an n-dimensional Euclidean space. Importantly, this tradition classification clustering approach requires exponentially more memory to store each sample point in feature space, and its transition history. Instead, the present feature space is an n-dimensional pseudo-Euclidean construct that replaces absolute distances with relative correlations between clusters. Since the sample points in each dimensions histograms have no cross-dimensional correlation, no cluster has a spatial neighborhood representation. In high dimension feature spaces, a cluster neighborhood is mainly useful the samples are Gaussian distributed, since the variance adjusted cluster means are used to calculate distances. However, in multi-modal distributions, i.e., not bell shaped, as is the present case, this representation has little advantage as Euclidean distance no longer applies in the traditional sense. Discrete feature variables, such as program names, pose an additional complication in Euclidean space, in that they are not numeric analogs of the feature dimensions, but set theory representations. To overcome the limitation of prior art, a new distance metric determines if sufficient classification distance exists between two multi-modal clusters in feature space. The present classification architecture replaces the Mahaloanobis distance, or variance adjusted Euclidean distance, of prior art with a dimensional voting architecture that estimates cluster neighborhood overlap as a percentage of dimensions that vote the overlap exists. This, alone, is not a large departure from current art, however, the metric of determining overlap between non-scalar, and non-Gaussian distributed clusters is novel. Again, there are three principle types of data, each handled differently; that is, scalar, histogram, and discrete, as defined herein. Scalar feature dimensions are modeled as Gaussian, and handled in the standard $\mu$, $\sigma_{cut}$ neighborhood discrimination method. Classification distances between corresponding histogram feature dimensions, however, are calculated as distribution correlations.

Distribution pseudo-correlation is defined as one minus the ratio of the distance between certain histogram bins, to the worst case distance. This simulates the desirable correlation behavior of:

1. output values are between 0 and 1
2. output linear increases (decreases) the more (dis)similar the distribution shapes and amplitudes.

The following commented procedural pseudo-code (in MatLab coding) determines if two histograms in a feature dimension belong to the same class (discretionary cutoff values are set with exemplary values):

1. To get the worst case distance, treat each histogram bin as an orthogonal Euclidean feature vector and calculate the worst case distance between them by placing all the samples of each in different bins.

worst_diff(:)=0;
   worst_diff(1)=hist1_all_samples;
   worst_diff(NUM_HIST_BINS)=hist2_all_samples;
   worst_distance=sqrt(worst_diff*worst_diff);

2. Calculate the effective Euclidean distance between the two histograms hist2hist_diff=hist1−hist2;
   histDiff_sqr=hist2hist_diff.*hist2hist_diff;
   user_dist=sqrt(sum(histDiff_sqr))/worst_distance;

3. Determine the probability density functions (pdf) for each histogram hist1_pdf=hist1/hist1_all_samples;
   hist2_pdf=hist2/hist2_all_samples;

4. Find the bins with the most distribution density, and sort on density
   [hist1_mass hist1_mass_bins]=sort(hist1_pdf);
   [hist2_mass hist2_mass_bins]=sort(hist2_pdf);
5. For hist1 and hist2, the find most dense bins with one standard deviations worth of sample points
   bin1_1sdv=NUM_HIST_BINS−min(find(cumsum (flip1r(hist1_mass))>0.68))+1;
   bin2_1sdv=NUM_HIST_BINS−min(find(cumsum (flip1r(hist2_mass))>0.68))+1;
   bins_1sdv=union([hist1_mass_bins (bin1_1sdv:NUM_HIST_BINS)], [hist2_mass_bins (bin2_1sdv:NUM_HIST_BINS)]);
6. Model the variance between histograms as the variation of the bin to bin distances. determine the average bin to bin distance between 1 sigma bins in hist1 and hist2 this is the estimated distance variation between corresponding sample points the more consistent the distance between bins, the more certain is the separation between histograms
   mean_diff=mean(hist2hist_diff(bins_1sdv));
   deviation=hist2hist_diff(bins_1sdv)−mean_diff;
   variance_dist=sqrt(mean(deviation*deviation'))/worst_distance;
7. Define histogram correlation as the ratio of the bin-wise Euclidean distance, to the worst case distance. define histogram classification correlation as the ratio of the one standard deviation bin-wise Euclidean distance, to the worst case distance.
   user1sdvDist=sqrt(sum(histDiff_sqr(bins_1sdv)))/worst_distance;
8. Calculate dimension-wise clusters as separated if the sigma reduced cluster distance is positive, for all types of dimensions
   ClassCutoffDims(idx)=user1sdvDist−variance_dist, %for idx=1 to NUM_DIMS The global dimension reduction procedure removes a dimension if ClassCutoffDims for a particular classification dimension is negative over substantially all Ad prototypes, since that feature has little, or no, predictive value to the system. The result of the local, and global prototype pruning is a minimal description of important feature values that identify, and separate each advertising category.

The BCE provides the Targeting Server (TargServer—FIG. 6) with the optimized set of advertising category prototypes for download to the MemberAgent in TV. The final step in the Ad targeting system is to classify a TV user into their most likely Ad categories. The MemberAgent then applies the exact same cluster distance to the identical BM as on the server side, with the addition of the following classification steps:
1. for all types of dimensions, calculate cluster membership as separated if the sigma reduced cluster distance is positive, then calculate the fraction of separating dimensions
   ClassCutoffDims(idx)=user1sdvDist−variance_dist; % for idx=1 to NUM_DIMS
   goodDimVec=find(ClassCutoffDims>0); % find all separated dimensions
   NUM_GOOD_DIMS=length(goodDimVec);
   goodDims(goodDimVec)=1; % set good Dimensions, goodDims init to 0
   AdGroupClassifRatio=NUM_GOOD_DIMS/NUM_DIMS;
2. determine pass or fail advertising category membership for system modules information
CLASS_VOTE_CUT=0.4; % fraction of dimensions that must be adequately separated to count cluster as classified
% determine clusters as separated if fraction of classification vote is CLASS_VOTE_CUT
if AdGroupClassifRatio>CLASS_VOTE_CUT
   AdGroupClusterVote=1;
else
   AdGroupClusterVote=0;
end Each advertising category group has a AdGroupClassifRatio which is the fraction of total dimensions that were adequately separated. It is a proportional measure of how similar to behavioral clusters are. That is, the more (dis) similar a user's behavior is to the advertising category prototype, the more (fewer) dimensions will overlap, hence the higher (lower) the AdGroupClassifRatio. Thus, each advertising category prototype has a AdGroupClassifRatio, or TargetingValue, that characterizes the degree that a user belongs to that targeted Ad group. The TargServer provides this information for each advertising category as a distribution of relative membership likelihoods. TargServer additionally determines a pass-fail advertising category membership value for system modules that require a binary prediction. AdGroupClusterVote is a binary membership value equal to one if there were sufficient dimensions that separated the user from the advertising category prototype under consideration, and zero otherwise.

MemberAgent periodically, or on demand, computes a user's advertising category membership likelihoods for system modules to use. The TASAgent uses advertising category membership information to store content that better matches a user's interest, or an advertising client's marketing goals. According to one embodiment, the TASAgent stores and deletes programming to statistically maximize the overall TargetingValue of the archived content.

As a basic example, consider the case where TargServer provides three templates—Male, Female, and teenager—to MemberAgent, and it calculates the TV user's membership TargetingValues as 0.2, 0.8, and 0.4. Then, TASAgent would only store Ads with metadata matching these categories, and in proportion to the TargetingValues. If the TargetingValues were normalized to sum to one, then they could be read as probabilities of Male=0.14, Female=0.29, and teenager=0.57. Hence, the TASAgent would store, and delete Ads, to match the same fractional distribution in local storage, and have stored Ads being 14% for Male, 29% for Female, and 57% for teenagers. The DispAgent similarly distributions Ad presentations to match Ad categories membership distributions. A wide variety of alternative, and more sophisticated targeting optimization strategies that fit into, or extrapolate from, this philosophy are possible.

It will be understood that inferring an advertising category from TV usage behavior is a very similar problem to identifying multiple persons in a household. The main difference is that the user prototypes are probabilistically inferred with real-time, untagged TV click-stream data. The same methodology and architecture applies to both problems; however, the multi-user identification problem principally requires additional techniques to effectively allocate TV usage observations to the correct user profile.

In addition, or as an alternative, to the foregoing description of the system to narrowly focus advertising targets, the system of the invention is also suitable to build preferred programming models. Here, the presentation agent, PresAgent interacts with the behavioral model BM to build local programming guides. PresAgent derives user presentation preferences through queries to the BMQagent. To motivate its necessity, an abridged system level summary precedes BMQengine interaction details with the PresAgent. In brief, the goal of the PresAgent is to build a programming guide for a virtual channel whose programming comes from programs locally stored by the TASAgent. The programming can be entertainment or advertising, audio, video, graphics, or any multi-media content. The TASAgent only stores the most preferred programs available, and constantly adds and deletes programs to continually fill the local storage while maximizing the overall user program preference rating. This virtual programming guide or virtual channel may have the look, and feel similar to a normal TV channel. It should seem very natural to place it as just another line in a live TV program guide. However, the virtual channel has the advantage of being customized to the user's preferences, and appears as an 'on demand' channel with content and showing times that largely match the viewer's personal expectations. To approach this goal, the PresAgent analyzes the stored programming presentation metadata and user's preferences to determine the optimal temporal program placement in the virtual channel's EPG (VEPG).

Program targeting metadata, especially for Ads, includes presentation information. Ad presentation metadata, from the head-end, directs the PresAgent to either follow these rules exactly, or to use local preference information to more intelligently sequence Ad content.

For non-revenue generating stored programming, the user has a similar option to direct the program arrangement of the virtual channel. Several VEPG building modes are possible, ranging from trivial, to highly context dependent.

A trivial implementation simply displays the local storage contents in the order of when they were recorded, and places paid-programming content exactly as specified in its presentation metadata. This has the advantage of simplicity, but burdens the user to search through many undesirable programs, and tends to force skipping around the guide for each program viewed. This is one step above analog VCR recordings in that it has random access, and a content listing.

A more sophisticated approach uses non-temporal program preference information to group programs of similar ratings. To the extent preference ratings are accurate, this method has the benefit of making it easier for the user to skip less liked programs, and continuously view liked programs with much less searching effort paid. However, there is still the overall feel of a sorted storage media content listing.

A significant advancement over the content preference sorting technique, uses temporal, and sequential preferences to create a VEPG ordered according to the real-time viewing context and preference history of the user. To accomplish this, when the user turns on the TV, or periodically before the TV is turned on, the PresAgent queries the BMQengine with each stored program presentation context, and dynamically builds a VEPG that best matches the user's behavioral preferences at that time and circumstance.

The following general algorithmic steps build a VEPG for a typical case:
1. Find all undesirable viewing times, and leave them empty.
2. Place the most likely program preferred at TV power on in current time slot.
3. Find all local program transition combinations and temporal preference and sequence programs accordingly.

As a tutorial example, assume the following 9, presumed preferred, programs are locally stored:

| Title | Genre | Air Time | Channel | Duration (min) |
|---|---|---|---|---|
| Market Wrap | Series/Finance | 1 pm weekdays | CNBC | 120 |
| Star Trek | Series/Sci-Fi | 1 am weekdays | UPN | 60 |
| Friends | Series/Comedy | 8 pm weekdays | NBC | 30 |
| The Tonight Show | Series/Talk | 11:30 pm weekdays | NBC | 60 |
| The Terminator | Movie/Sci-Fi | 9 pm Wed. | HBO | 150 |
| Seinfeld | Series/Comedy | 7 pm weekdays | FOX | 30 |
| Saturday Night Live | Series/Comedy | 11:30 pm weekdays | NBC | 90 |
| NOVA | Series/Documentary | 9 pm Tues. | PBS | 60 |
| NFL football | Sports | 6 pm Mon. | ABC | 210 |

While the TV is off, or upon turn on, the PresAgent determines the context of the current session. The current context includes information such as day of week, the time of day, time since last session, and last title/genre/channel.

The first items to determine are the time intervals never watched. This will blank out VEPG time intervals that historically often go unwatched. The query looks like:
'QueryFunction=time_sum, StateType=LikedChannels, fromStateID=null, toStateID=null, TimeType=TOD, TimeValue=null'.

Here we used LikedChannels as TOD activity indicator. Any other 'liked' state category would have served equally well.

A typical response to the TASAgent's query could be:
[(LATE_NIGHT,VERY_OFTEN); (WEE_HOURS, NEVER); (EARLY_MORNING; NEVER); (MORNING, MOSTLY); (LATE_MORNING; RARELY); (AFTER_NOON; RARELY); (LATE_AFTER_NOON; SOMETIMES); (EVENING; ALMOST_ALWAYS); (NIGHT, TYPICALLY)]

The TASAgent searches the result matrix for the least likely TOD intervals, in particular
[(WEE_HOURS, NEVER),); (EARLY_MORNING; NEVER), (LATE_MORNING; RARELY); (AFTER_NOON; RARELY)].

The corresponding time intervals would be left blank in the VEPG. However, if the current TV viewing period is in a blanked interval, the current VEPG time intervals are made available for at least the user's typical TV session length. That is, upon TV turn on, there is always programming listed in the current VEPG time index, and at least as long as the user normally watches TV for that period.

The available time intervals are searched for preferential program placement.

The PresAgent proceeds to search for programming that the user prefers upon starting a TV session. Each program is searched for channel/genre/title/actor/etc. start-up preference. Each modeled behavioral state (i.e., liked chan, genre, title, etc.) is queried, and results are accumulated in a StartUp-Ratings matrix. A typical query to search for start-up genre preferences is:

Query([QueryFunction=top_n=5, StateType=genre, fromStateID=off, toStateID=null, TimeType=TOD, TimeValue=night]).

The same query style is repeated for each state type, and the results are compared against the available programs.

PresAgent further considers contextual preferences with respect to the last program viewed by searching through every combination of temporal and StateType transitions. Assume that the new session's DOW=Monday, TOD=night (10 pm), last title='Wheel of Fortune'@ Monday evening 7 pm, last_genre=game_show, and last_channel=NBC.

A typical query includes a search for likely transitions occurring the amount of time since the last title, genre, and channel viewed, three hours (10 pm-7 pm) for this example. A search for the top 3 preferred title transitions three hours after watching 'Wheel of Fortune', is:

Query: [QueryFunction=top n=3, StateType=Title, fromStateID='Wheel of Fortune', toStateID=null, TimeType=TIP, TimeValue=3 hrs].

A similar search is repeated for genre, and channel.

PresAgent compares the bias for all StartUpRatings and last program based preferences, against the remaining programs for the best match. If, for this example, a likely start-up genre was 'comedy series', and the most likely start-up channel is 'NBC', then a matching program with the highest preference rating, say Seinfeld, would be placed as the program in the current time slot if no other transition is more preferred three hours after watching 'Wheel of Fortune', game_shows, or NBC.

The system keeps a table of session times for every time interval, each day of the week. If a typical session for this user at this time is 1.5 hours, then this is the time block to fill. The PresAgent tests each stored program for transitional bias to follow Seinfeld. Again, all liked state types are search for the most likely transition from the state associated with Seinfeld. A typical first query of the over all transition preference search could be:

[QueryFunction=mostLikely, StateType=Title, fromStateID='Seinfeld', toStateID=null, TimeType=TOD, TimeValue=night]

PresAgent finds the closest match and places it after Seinfeld. For example, the user may have a strongest preference to watch a science documentary series after a short comedy independent of time, and NOVA would best follow. After two programs are linked, PresAgent also queries for any type of state sequence preferences; i.e., title, genre, channel, etc. For the example sequence, an initial query is:

"QueryFunction=mostLikely, StateType=TitleSequ, fromStateIDs=["Seinfeld", "NOVA"], LengthValue=null"

or

"QueryFunction=mostLikely, StateType=GenreSequ, fromStateIDs=["series:comedy", "series:science"], LengthValue=null"

PresAgent attaches the most likely and specific result to the prior sequence. This process continues for each program at the end of the growing sequence, until the typical session time block is filled. PresAgent proceeds to fill all other available VEPG time blocks. Each block of time starts with a sequence seed to grow from.

The PresAgent tests each remaining program over all available time slots, and places highly likely temporal (non-temporal, DOW, TOD, TIP) matches accordingly. For example, a typical query to check the 'Football' program placement preference, could start on an available Sunday afternoon slot:

Query: [QueryFunction=mostLikely, StateType=likedGenre, fromStateID='sports', toStateID=null, TimeType=DOW, TimeValue=Sunday]

and

Query: [QueryFunction=mostLikely, StateType=likedGenre, fromStateID='sports', toStateID=null, TimeType=TOD, TimeValue=afternoon]

If watching sports on Sunday afternoon was more likely than any other remaining program, and alternate time placement, then football would start that time block, and the herein described sequence building method would fill the rest of the session block.

The first pass of the VEPG placement algorithm only commits highly preferred programs in each context. If any programs remain for VEPG entry, subsequent iterations place the most likely programs. If there is not sufficient historic evidence to infer upon, the PresAgent makes arbitrary placements as a last resort.

Importantly, every time a viewer turns on the TV, or a new user is detected, PresAgent generates a potentially different VEPG customized to the viewers preference, and the context of that session. Several other refinements, optimizations, and extensions on the basic VEPG building mechanism are possible and contemplated. Some, herein described, additional contextual resolution techniques expand on the aforementioned algorithm. The BMQengine provides the PresAgent with many other contextual, and behavioral bias queries. Some include:

1. Last program watched
2. Behavioral psychometric
3. Attention span
4. ending bias These measures effect sequential program placement preference as follows.

Item 1 is a mechanism to recalculate future VEPG entries based on the last program viewed by the user. Similar as in determining start-up program preferences, discussed herein, the PresAgent queries for all temporal and StateType transition preferences from the programs chosen by the user. The VEPG is rebuilt, as previously prescribed, with the most likely query result matching program as the new seed.

PresAgent uses psychometrics, item 2, such as diversity, curiosity, focus, and attention span to adjust program sequencing closer to the viewer's liking. For example, if the user has a very high (low), genre diversity or focus measures, then the PresAgent proportionately avoids (prefers) sequences that repeat the same genre. Similarly, a high (low) curiosity measure biases the PresAgent to proportionately prefer (avoid) related, but less frequented sequence candidates. A high (low) curiosity metric may arise from a user who has a low (high) attention, and often fails (succeeds) to find liked programming. Another possibility is that the user has a small core group of liked program types, but often searches beyond this group for new programs of interest. The curiosity measure, thus, looks for a user's high tendency to search outside past liked program types, with little information of why.

Attention span, item 3, detects the amount and quality of time a users tends to spend on various program aspects. A histogram models the attention distribution for each modeled parameter. Tracked parameters include any EPG category entry, such as a genre type, a title, a channel, or TV watching statistics including session times. All attention span parameters are context sensitive as supported by the BM. PresAgent uses attention span to determine the program length most preferred by the viewer in a given context. For example, a user could generally like a long drama movie, but not prefer it in the mornings before going to work, or after a game show, and most prefer it on weekend nights. This presentation filter avoids many of the obvious user program length, preference conflicts by using past time watched in a given context as a bias to favor future programs of similar length.

Once a TV session, or a VEPG program sequence, approaches the typical TV watching attention span in that context, the PresAgent has a preference to place programs that best match user's ending bias history.

Ending bias, item 4, is the past tendency to end a TV session after watching a certain BM category. An example of the ProfAgent learning a new ending bias from program replay selections, is if a user often stops watching TV in the late evening after replaying late night talk shows, such as 'The Tonight Show' during the week, instead of late night. The ProfAgent learns from live, and replayed program usage equally. The ability to learn preferred replaying patterns enables the PresAgent to adaptively place programming in the most preferred VEPG context. A typical TOD ending bias BMQagent query for any StateType, e.g., for talk shows, appear like:

Query: [QueryFunction=mostLikely, StateType=likedGenre, fromStateID=null, toStateID=Series/Talk, TimeType=TOD, TimeValue=late evening].

The PresAgent, having a similar task as the PDE, creates a virtual program viewing guide that tends to match the daily variation and novelty that a user prefers.

PresAgent places VEPG Ads in a very similar fashion as non-paid programming, except placement decisions include presentation metadata and machined learned user targeting information. Ads differ from programs in another significant way, in that their initial VEPG placement is only a default initialization, subject to modification depending on the users programming choices, rights of the Ad company as communicated via controlling metadata. Although contemplated as an alternative embodiment, it is similarly possible to continually rebuild the programming VEPG based the user's in-progress viewing behavior; however, the primary benefit applies to Ad scheduling. The Ads are not necessarily visible in the VEPG, but are scheduled as inter-program and intra-program commercial breaks. The breaks are either head-end (intra-program), or internally (inter-program) generated.

The PresAgent is aware, in advance, through program metadata, or some other means, of the exact timing for intra-program Ad breaks. In the present embodiment, the PresAgent prefills all Ad breaks with optimally selected pre-stored Ads. In practice, there is a significant advantage to this procedure. Often, due to limited system resources in the TV, there is not enough time to, in real-time, calculate the best Ads to schedule in an Ad break that may be only a few minutes away. This situation usually occurs at the beginning of a program, or when someone arrives just before a scheduled Ad break. In that case, the default PresAgent sequencing of Ads is a best estimate of optimal placement. When there is enough time for calculations, the PresAgent can query the BMQengine for user Ad sequencing preferences.

The procedure to sequence Ads is the same as that for programming with the following Ad specific definitions:
1. title is the product's UPC or Ad sponsor's name
2. genre is the sponsoring company's main SIC
3. The semaphore Ad_null replaces null as a query wildcard to search only Ads.

Several exemplary queries follow that demonstrate a range of Ad sequencing contextual placement capabilities.

Example A

Find the top three products (UPC) liked at night during Seinfeld:
    Query: [QueryFunction=top_n=3, StateType=title, fromStateID=Ad_null, toStateID='Seinfeld', TimeType=TOD, TimeValue=night]

Example B

Find the top 5 programs liked on Sunday after a Pepsi commercial:
    Query: [QueryFunction=top_n=5, StateType=title, fromStateID=Pepsi_UPC, toStateID=null, TimeType=DOW, TimeValue=Sunday]

Example C

Find the most liked genre at any time before an auto parts commercial:
    Query: [QueryFunction=mostLikely, StateType=LikedGenre, fromStateID=null, toStateID=AutoParts_SIC, TimeType=nonTemporal, TimeValue=null]

Example D

Of the user's liked Ads, find the top 3 Ad product categories during a sports program on Sundays:
    Query: [QueryFunction=top_n=3, StateType=LikedGenre, fromStateID=sports, toStateID=Ad_null, TimeType=DOW, TimeValue=Sunday]

Having thus described the general background upon which a virtual channel and/or a virtual electronic program guide VEPG can be established, we move to describe a specific implementation of an exemplary VEPG. The PresAgent builds a default VEPG just before the user turns on the TV, or upon turn-on, that best matches the temporal, sequencing, and program preferences of the user before receiving new user input of actual choices. The PresAgent has the option, and ability when time permits, to rebuild the default VEPG in real-time based on user content selection patterns. The combination of a 'best educated guess' default content placement, and real-time context sensitive recalculation provides for a robust, and optimal user preference estimation.

A typical coarse VEPG generated by the PresAgent from the example set of stored programs appears as:

| | Sunday | Monday | Tuesday | Wednesday | Thursday | Friday | Saturday |
|---|---|---|---|---|---|---|---|
| Late Afternoon | | Market Wrap | NFL football | Market Wrap | Market Wrap | Market Wrap | |
| Evening | Saturday Night Live | Star Trek | Friends | NOVA | Star Trek | Friends | The Terminator |
| Night | | Seinfeld The Tonight Show | Seinfeld The Tonight Show | Seinfeld The Tonight Show | Seinfeld The Tonight Show | Seinfeld The Tonight Show | |

This program placement could arise from the following scenario of system-detected, user contextual preferences. 'The Terminator' program requires a long attention span, and although weekday nights qualify equally with Saturday night, the liking of movies largely occurs in the latter time slot. Suppose, the user has a strong general preference to watch CNBC, and financial programs during weekday late afternoons, after coming home from work. The PresAgent, furthermore, could detect that after the TASAgent recorded 'Market Wrap' a few times, the user watched it during this time period, and places it accordingly. However, if the PresAgent detects a stronger bias to watch Monday night 'NFL football' on, say, Tuesday late afternoons instead, with no financial programming ever watched, then the football game takes the latter, more preferred, slot. The user might similarly show a preference for 'Saturday Night Live', but on Sunday nights instead. A repeatable pattern typically could be starting a weekday night session with 'Seinfeld' and a strong tendency to watch, and end the session with, 'The Tonight Show' thereafter.

If the PresAgent detects a low (high) state diversity across a temporal context, such as daily time slot, it prefers to decrease (increase) the variety of programs in that time period. In the present example, the user has a low diversity measure in the late afternoon and night time blocks, but a much higher measure during the evening time period. In the absence of sequential or temporal bias, the PresAgent can use diversity, or curiosity information to distribute preferred programming more appropriately. In this case, the PresAgent is aware that the evening time slot is popular and the user has a similar preference for Sci-Fi, comedies, and movies. However, if the user's diversity measures are higher in this period, then the PresAgent will avoid filling the daily slot with only the most preferred daily program type, say 'Star Trek', and instead distribute the available slots with a variety of short, liked programming. If 'NOVA' has a 'little liked' rating in the past, a high curiosity valuation in the evening slots would motivate the PresAgent to insert 'NOVA' into the lineup. Importantly, the user would find a VEPG that reflects their 'prime time' as night (9-12 pm) instead of the traditional 8 pm-10 pm, and viewing pattern that matched their highly repeatable behaviors, with the periodic exceptions that arise, and fills their more exploratory, if any, periods with the range of programs that they might like.

Over time, the system detects highly repeatable preference patterns, as well as important exceptions. The selection of, and learning from, stored program usage patterns continually teaches the system when, and in what sequence program categories are preferred. A parallel description applies to optimal Ad placement.

We claim:

1. A television rating computer system for targeted program delivery, comprising:
   a server-side computer system for evaluating television behavioral viewing data from a plurality of users and for categorizing data into non-demographically classifiable category groups;
   a clustering engine included in the server-side computer system for:
      receiving the television behavioral viewing data, processing the television behavioral viewing data;
      using a category training set for clustering the television behavioral viewing data into the non-demographically classifiable category groups over a predetermined training period;
      generating category behavioral profiles targeting the non-demographically classifiable category groups; and
      generating advertising category prototypes by removing television behavioral viewing data parameters most common between the category behavioral profiles;
   a client-side computer system coupled to the server-side computer system and configured to classify a television user into at least one of the non-demographically classifiable category groups based on advertising category prototypes received from the clustering engine;
   a contextual behavioral profiling agent included in the client-side system for deriving profiling information related to a television user's viewing behavior with content and usage-related preferences; and
   a behavioral model database for storing in the client-side system the profiling information derived by the profiling agent.

2. The television rating system according to claim 1, wherein said clustering engine is a software agent residing in a central computer system at a television distribution headend in the server side system and is programmed to create template behavioral profiles each corresponding to an associated one of the targeted category groups.

3. The television rating system according to claim 2, wherein said clustering engine is trained substantially exclusively on tagged viewing data from a given target group to learn a most general profile of the given target group.

4. The television rating system according to claim 2, wherein said clustering engine is programmed to generalize user profiles in a targeted category group into an aggregation representative of all dimensions most strongly in common for the targeted group and all dimensions most unique across several of the targeted category groups.

5. The television rating system according to claim 1, which further comprises an advertisement manager residing at the server-side system and connected to query said behavioral model database in the client-side system, said advertisement manager being programmed to parameterize behavioral profiles of said behavioral model database and to download the parameterized behavioral profiles to an advertising category membership agent residing at said client-side system.

6. The television rating system according to claim 5, wherein said advertisement manager includes a television user's history and is configured to reconstruct the downloaded parameterized behavior profiles in accordance with the television user's history to determine a most likely advertising category for the television user, and to store the results as targeting category probabilities in a user category database.

7. The television rating system according to claim 5, which further comprises targeting agents and presentation agents disposed at said client-side system for creating an optimization of targeted category probabilities and relevant preference information in order to selectively capture, store, and display advertisements downloaded in accordance with the optimization.

8. The television rating system according to claim 1, wherein the television behavioral viewing data from the plurality of users is used to create the category groups.

9. The television rating system according to claim 8, wherein the profiling information is used to determine a category group to associate a user with.

10. The television rating system according to claim 1, wherein the television behavioral viewing data includes contextual transition data.

11. The television rating system according to claim 10, wherein the contextual transition data is based on day of week and time of day.

12. The television rating system according to claim 10, wherein the contextual transition data is based on a previous type of television program.

13. The television rating system according to claim 1, wherein the category training set is initially a preexisting collection of advertising categories.

14. The television rating system according to claim 13, wherein all viewed programs within a given predefined time interval are rated and sorted at once to provide a behavior model estimate associated with the client side system.

15. The television rating system according to claim 1, wherein the advertising category prototypes are formed during the predetermined training period.

16. The television rating system according to claim 1, wherein the predetermined training period is continuously adjusted.

17. The television rating system according to claim 1, wherein the predetermined training period duration is different based on the corresponding classifiable category group.

18. In an interactive display system having a head-end side for distributing program content that has been pruned for a category, and a client side receiving the program content and selectively displaying the program content in accordance with the selection of a user, a preference engine for determining a preferred program content for the user, comprising:
 a user monitoring device receiving the pruned program content at the client side for recording contextual transition behaviors profiling the user to continually build a user profile of preferences and contextual transition behaviors associated with the user; and
 a program distributing device at the head-end side for providing to the user the program content in accordance with the user profile, wherein a user is classified at the client-side into at least one category group based on advertising non-demographically classifiable category prototypes received from the head-end side, wherein the advertising non-demographically classifiable category prototypes are generated by removing television viewing data parameters most common between category behavioral profiles formed at the head-end side by using a category training set for clustering television behavioral viewing data from a plurality of users into non-demographically classifiable category groups over a predetermined training period.

19. The interactive display system and preference engine according to claim 18, wherein said user monitoring device models the user's behavioral interaction with advertising program content and with entertainment program content.

20. The interactive display system and preference engine according to claim 18 wherein the program distributing device is connected to receive from the head-end metadata information describing advertising content and entertainment program content, and is programmed to adjust the user profile by combining the metadata information with the preferences and contextual transition behaviors of the user, and to build a relational knowledge base with associations among the behavior, demographics, and program content preferences of the user.

21. The interactive display system and preference engine according to claim 18 wherein the user maintaining device is programmed to model patterns of usage behaviors with a behavioral model and to extract key usage information from the behavioral model into a behavioral database having a confidence value that reflects an estimate of a structural and sampling quality of the data in the behavioral database.

22. In a program content delivery computer system having a head-end side and a client side, a system for targeting program delivery, comprising:
 a central data system at the head-end side which receives viewing information from a plurality of users selected from the group consisting of watch data, watch start time data, watch duration data, and watch channel data, demographic information describing a program user, and electronic program guide information with metadata describing a program content;
 a demographic cluster knowledge base acquirer receiving from the client side behavioral data of a user, the knowledge base acquirer outputting a knowledge base based on the viewing information in the form of a transition matrix with weight sets, the transition matrix used for predicting a particular category group of a plurality of classifiable category groups for classifying the user based on the behavioral data of the user; and
 a program content generating module disposed at the head-end side and providing to the client side streams of program content based on the predicted category group of the user, wherein a user is classified into at least one category group based on advertising category prototypes transmitted from the head-end side, wherein the advertising category prototypes are generated at the head-end side by removing television viewing data parameters most common between category behavioral profiles formed at the head-end side by using a category training set for clustering the viewing information from the plurality of users into the plurality of classifiable category groups over a predetermined training period.

23. The program content delivery system according to claim 22, which further comprises a realtime feedback link for delivering to said central data system at the head-end side realtime information with click stream data concerning the viewing behavior of the user.

24. The program content delivery system according to claim 22, wherein said demographic cluster knowledge base acquirer is based on a hidden Markov model.

25. The program content delivery system according to claim 24, wherein said demographic cluster knowledge base acquirer is configured to parameterize the user's behavior with a double random pseudo hidden Markov process, and to define a low-level statistical state machine modeling a behavioral cluster and a top-level statistical state machine with active behavioral clusters and an interaction among the active behavioral clusters.

26. The program content delivery system according to claim 22, wherein said demographic cluster knowledge base acquirer and said program content generating module are software modules each adapted to be stored on a machine readable medium in the form of a plurality of processor-executable instructions.

27. The program content delivery system according to claim 22, wherein said demographic cluster knowledge base acquirer generates demographic cluster information of the user in terms of statistical state machine transition models.

28. The program content delivery system according to claim 27, wherein the statistical state machine transition models are defined in a transition matrix at the head-end side, and the transition matrix contains information of program transitions initiated by a viewer at the client side.

29. The program content delivery system according to claim 22, wherein the transition matrix is one of at least two concurrent transition matrices including a channel matrix and a genre matrix.

30. The program content delivery system according to claim 22, wherein the transition matrix is a two-dimensional matrix with transitions from television channels in normal form to television channels in temporal form.

31. The program content delivery system according to claim 22, wherein said demographic cluster knowledge base acquirer is configured to define a double random process with a plurality of dimensions, and to determine parallel statistical state machine transition events in at least two of three state categories including channel, genre, and title of the program content.

* * * * *